United States Patent
Liu

(10) Patent No.: US 11,622,331 B2
(45) Date of Patent: Apr. 4, 2023

(54) METHOD FOR DETERMINING STATE OF TERMINAL DEVICE, AND TERMINAL DEVICE AND ACCESS NETWORK DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 326 days.

(21) Appl. No.: 16/924,762

(22) Filed: Jul. 9, 2020

(65) Prior Publication Data

US 2020/0344691 A1 Oct. 29, 2020

Related U.S. Application Data

(63) Continuation of application No. PCT/CN2019/070721, filed on Jan. 7, 2019.

(30) Foreign Application Priority Data

Jan. 10, 2018 (WO) ............... PCT/CN2018/072143
May 21, 2018 (WO) ............... PCT/CN2018/087718

(51) Int. Cl.
*G06F 1/3209* (2019.01)
*H04W 52/02* (2009.01)
(Continued)

(52) U.S. Cl.
CPC ...... *H04W 52/0235* (2013.01); *G06F 1/3209* (2013.01); *G06F 1/3231* (2013.01);
(Continued)

(58) Field of Classification Search
CPC ............ G06F 1/3278; H04W 52/0235; H04W 52/0216; Y02D 30/70
See application file for complete search history.

(56) References Cited

U.S. PATENT DOCUMENTS 8,780,729 B2 7/2014 Dalsgaard
9,374,780 B2 6/2016 Sundararajan et al.
(Continued)

FOREIGN PATENT DOCUMENTS

CN 101932136 A 12/2010
CN 102395180 A 3/2012
(Continued)

OTHER PUBLICATIONS

First Office Action of the European application No. 19738301.1, dated Sep. 10, 2021. 6 pages.
(Continued)

*Primary Examiner* — Vincent H Tran
(74) *Attorney, Agent, or Firm* — Perkins Coie LLP

(57) ABSTRACT

The embodiments of the disclosure relate a method for determining a state of a terminal device, a terminal device and an access network device. The method includes that: a terminal device receives configuration information from an access network device, the configuration information being configured to instruct the terminal device to enter an inactive state; and the terminal device determines whether to enter a power saving mode under the inactive state, a radio frequency module of the terminal device in the power saving mode being off. According to the method for determining a state of a terminal device, terminal device and access network device of the embodiments of the disclosure, the terminal device under the inactive state may enter the power saving mode, and power consumption of the terminal device is further reduced.

8 Claims, 17 Drawing Sheets

400

A core network device determines timer information of a terminal device through a control plane entity, the timer information including a time length of a second timer and/or a time length of a third timer, the time length of the second timer being configured for the terminal device to enter a power saving mode from a communication mode in response to timeout of the second timer, the time length of the third timer being configured for the terminal device to enter the communication mode from the power saving mode in response to timeout of the third timer, a radio frequency module of the terminal device in the power saving mode being off and a radio frequency channel of the terminal device in the communication mode being on — S410

The core network device sends service data to the terminal device through a user plane entity according to the timer information — S420

(51) Int. Cl.
*G06F 1/3231* (2019.01)
*G06F 1/3287* (2019.01)
(52) U.S. Cl.
CPC ...... *G06F 1/3287* (2013.01); *H04W 52/0222* (2013.01); *H04W 52/0229* (2013.01); *H04W 52/0254* (2013.01)

(56) References Cited

U.S. PATENT DOCUMENTS

| | | | |
|---|---|---|---|
| 9,485,728 B1* | 11/2016 | Banerjea | H04W 52/0212 |
| 2011/0267955 A1 | 11/2011 | Dalsgaard | |
| 2013/0143515 A1* | 6/2013 | Zhu | H04W 76/50 |
| | | | 455/458 |
| 2014/0321272 A1* | 10/2014 | Bangolae | H04L 65/65 |
| | | | 370/230 |
| 2015/0016323 A1 | 1/2015 | Sundararajan et al. | |
| 2015/0043398 A1 | 2/2015 | Fwu | |
| 2015/0043403 A1 | 2/2015 | Martinez Tarradell | |
| 2015/0043439 A1 | 2/2015 | Sajadieh et al. | |
| 2015/0043445 A1 | 2/2015 | Xiong | |
| 2015/0043447 A1 | 2/2015 | Stojanovski | |
| 2015/0043449 A1 | 2/2015 | Bangolae | |
| 2015/0117285 A1 | 4/2015 | Xie et al. | |
| 2016/0057689 A1* | 2/2016 | Fujishiro | H04W 36/16 |
| | | | 370/331 |
| 2016/0127997 A1* | 5/2016 | Ang | H04L 1/1812 |
| | | | 370/311 |
| 2016/0156440 A1 | 6/2016 | Sergeyev et al. | |
| 2016/0191135 A1 | 6/2016 | Chen et al. | |
| 2016/0309416 A1 | 10/2016 | Gao | |
| 2016/0373994 A1 | 12/2016 | Yiu | |
| 2017/0013554 A1* | 1/2017 | Jain | H04L 5/14 |
| 2017/0099635 A1 | 4/2017 | Uchino et al. | |
| 2017/0105127 A1 | 4/2017 | Xiong et al. | |
| 2017/0171821 A1 | 6/2017 | Agrawal | |
| 2017/0245213 A1* | 8/2017 | Martinez Tarradell | ................ |
| | | | H04W 52/0219 |
| 2017/0257904 A1* | 9/2017 | Mildh | H04W 68/005 |
| 2017/0289761 A1 | 10/2017 | Stojanovski et al. | |
| 2018/0092155 A1* | 3/2018 | Hong | H04W 36/32 |
| 2018/0184306 A1 | 6/2018 | Xiong et al. | |
| 2019/0098549 A1* | 3/2019 | Wang | H04W 36/16 |
| 2019/0281651 A1* | 9/2019 | Lee | H04W 76/25 |

FOREIGN PATENT DOCUMENTS

| | | | |
|---|---|---|---|
| CN | 102487541 A | 6/2012 | |
| CN | 102595606 A | 7/2012 | |
| CN | 102843208 A | 12/2012 | |
| CN | 103259939 A | 8/2013 | |
| CN | 103582087 A | 2/2014 | |
| CN | 103582113 A | 2/2014 | |
| CN | 103889039 A | 6/2014 | |
| CN | 105359059 A | 2/2016 | |
| CN | 105684526 A | 6/2016 | |
| CN | 106604221 A | 4/2017 | |
| WO | 2013189508 A1 | 12/2013 | |
| WO | 2015009674 A1 | 1/2015 | |
| WO | 2015021284 A1 | 2/2015 | |
| WO | 2015174327 A1 | 11/2015 | |
| WO | 2016050075 A1 | 4/2016 | |

OTHER PUBLICATIONS

Second Office Action of the European application No. 19738301.1, dated Mar. 9, 2022. 8 pages.
Written Opinion of the Singaporean application No. 11202006624W, dated Mar. 23, 2022. 8 pages.
English translation of the Written Opinion of the International Search Authority in the international application No. PCT/CN2019/070721, dated Mar. 27, 2019.
English translation of the Written Opinion of the International Search Authority in the international application No. PCT/CN2018/072143, dated Sep. 30, 2018.
English translation of the Written Opinion of the International Search Authority in the international application No. PCT/CN2018/087718, dated Sep. 28, 2018.
3GPP TS 23.401 V13.5.0 (Dec. 2015), General Packet Radio Service (GPRS) enhancements for Evolved Universal Terrestrial Radio Access Network (E-UTRAN) access (Release 13).
3GPP TS 36.304 V13.1.0 (Mar. 2016), Evolved Universal Terrestrial Radio Access (E-UTRA); User Equipment (UE) procedures in idle mode (Release 13).
Supplementary European Search Report in the European application No. 19738301.1, dated Jan. 11, 2021.
3GPP TSG-RAN WG2#98, Tdoc R2-1704123, Ericsson, "Further considerations on RAN and CN paging in INACTIVE", mailed on May 14, 2017.
3GPP TSG-RAN WG2 Meeting #99, R2-1708429, vivo, "DRX configuration for Inactive UE", mailed on Aug. 20, 2017.
2015 European Conference on Networks and Communications (EuCNC), Li-Ping Tung, Li-Chun Wang, Cheng-Wen Hsueht, Chung-Ju Chang, "Analysis of DRX PowerSaving with RRC StatesTransition in LTE Networks", mailed on Jun. 29, 2015.
International Search Report in the international application No. PCT/CN2019/070721, dated Mar. 27, 2019.
International Search Report in the international application No. PCT/CN2018/072143, dated Sep. 30, 2018.
Catt et al. "New SID: Study on UE Power Saving and Wakeup Mechanism in NR" 3GPP TSG-RAN Meeting #78, RP-172718, Dec. 14, 2017 (Dec. 14, 2017), text, section 3.
International Search Report in the international application No. PCT/CN2018/087718, dated Sep. 28, 2018.
First Office Action of the Chinese application No. 201980006616.0, dated Nov. 24, 2022. 27 pages with English translation.

* cited by examiner

200

An access network device determines whether a terminal device enters a power saving mode under an inactive state, a radio frequency module of the terminal device in the power saving mode being off — S210

The access network device sends configuration information to the terminal device, the configuration information being configured to instruct the terminal device to enter the inactive state and whether to enter the power saving mode under the inactive state — S220

A core network device determines timer information of a terminal device through a control plane entity, the timer information including a time length of a second timer and/or a time length of a third timer, the time length of the second timer being configured for the terminal device to enter a power saving mode from a communication mode in response to timeout of the second timer, the time length of the third timer being configured for the terminal device to enter the communication mode from the power saving mode in response to timeout of the third timer, a radio frequency module of the terminal device in the power saving mode being off and a radio frequency channel of the terminal device in the communication mode being on ~ S410

The core network device sends service data to the terminal device through a user plane entity according to the timer information ~ S420

A core network device determines timer information by negotiation with a terminal device through a control plane entity, the timer information including a time length of a second timer and/or a time length of a third timer, the time length of the second timer being configured for the terminal device to enter a power saving mode from a communication mode in response to timeout of the second timer, the time length of the third timer being configured for the terminal device to enter the communication mode from the power saving mode in response to timeout of the third timer, a radio frequency module of the terminal device in the power saving mode being off and a radio frequency channel of the terminal device in the communication mode being on ⸺ S510

The core network device sends the timer information to an access network device through the control plane entity, the timer information being configured for the access network device to determine time when the terminal device is in the communication mode ⸺ S520

The core network device sends service data to the access network device through a user plane entity, the service data being configured to be sent to the terminal device by the access network device within the time ⸺ S530

A terminal device receives configuration information from an access network device, the configuration information being configured to instruct the terminal device to enter an inactive state ⟿ S1410

The terminal device determines whether to enter a power saving mode under the inactive state, the terminal device in the power saving mode adopting DRX with an extended cycle ⟿ S1420

A core network device determines an extended cycle of DRX adopted for a terminal device by negotiation between the access network device and the terminal device, the extended cycle being configured for the terminal device to determine whether to enter a power saving mode under an inactive state and the DRX with the extended cycle being adopted for the terminal device in the power saving mode — S1610

FIG. 16

METHOD FOR DETERMINING STATE OF TERMINAL DEVICE, AND TERMINAL DEVICE AND ACCESS NETWORK DEVICE

CROSS-REFERENCE TO RELATED APPLICATIONS

This application is a continuation of International Patent Application No. PCT/CN2019/070721, filed on Jan. 7, 2019, and claims priority to International Patent Application No. PCT/CN2018/072143, filed on Jan. 10, 2018 and entitled "METHOD FOR DETERMINING STATE OF TERMINAL DEVICE, AND TERMINAL DEVICE AND ACCESS NETWORK DEVICE", and to International Patent Application No. PCT/CN2018/087718, filed on May 21, 2018 and entitled "METHOD FOR DETERMINING STATE OF TERMINAL DEVICE, AND TERMINAL DEVICE AND ACCESS NETWORK DEVICE", the contents of which are hereby incorporated by reference in their entirety.

TECHNICAL FIELD

The disclosure relates to the field of communications, and particularly to a method for determining a state of a terminal device, a terminal device and an access network device.

BACKGROUND

Under present modes, a terminal device may enter an idle state and further enter a power saving mode for saving power, when the terminal device does not have data for transmission. The terminal device in the power saving mode does not execute any data transmission-related operation, as in an off state. When the terminal device is required to wake up from the power saving mode, for example, when terminal device is required to execute data transmission or area updating, the terminal device may initiatively establish a connection with a network device. When the terminal device is in the power saving mode, the network device is inaccessible for the terminal device. When there is incoming data, the network device may send the data to the terminal device when the terminal device wakes up, for example, executing data transmission or area updating.

The concept of inactive state has been introduced into a 5th Generation (5G) system. When a terminal device is under the inactive state, the context of the terminal device is still stored on a network device side, but no data is transmitted between the terminal device and the network device. When the terminal device is needed to transmit data, the terminal device and the network device may recover the context of the terminal device, so that time for data transmission is saved. However, there is no solution about how to further reduce power consumption of the terminal device under the inactive state.

SUMMARY

A first aspect provides a method for determining a state of a terminal device, which may include that: a terminal device receives configuration information from an access network device, the configuration information being configured to instruct the terminal device to enter an inactive state; and the terminal device determines whether to enter a power saving mode under the inactive state, a radio frequency module of the terminal device in the power saving mode being off A second aspect provides a method for determining a state of a terminal device, which may include that: an access network device determines whether a terminal device enters a power saving mode under an inactive state, a radio frequency module of the terminal device in the power saving mode being off and the access network device sends configuration information to the terminal device, the configuration information being configured to instruct the terminal device to enter the inactive state and instruct whether to enter the power saving mode under the inactive state.

A third aspect provides a terminal device, which may include a processor, a memory configured to store a computer program executable by the processor, and a transceiver configured to send and receive information under control of the processor.

The processor is configured to:

control the transceiver to receive configuration information from an access network device, the configuration information being configured to instruct the terminal device to enter an inactive state; and determine whether to enter a power saving mode under the inactive state, a radio frequency module of the terminal device in the power saving mode being off A fourth aspect provides an access network device, which may include a processor, a memory configured to store a computer program executable by the processor, and a transceiver configured to send and receive information under control of the processor.

The processor is configured to:

determine whether a terminal device enters a power saving mode under an inactive state, wherein a radio frequency module of the terminal device in the power saving mode is off; and control the transceiver to send configuration information to the terminal device, wherein the configuration information is configured to instruct the terminal device to enter the inactive state and instruct whether to enter the power saving mode under the inactive state.

BRIEF DESCRIPTION OF THE DRAWINGS

FIG. 2 is a schematic flowchart of a method for determining a state of a terminal device according to another embodiment of the disclosure.

FIG. 4 is a schematic flowchart of a method for determining a state of a terminal device according to another embodiment of the disclosure.

FIG. 5 is a schematic flowchart of a method for determining a state of a terminal device according to another embodiment of the disclosure.

FIG. 14 is a schematic flowchart of a method for determining a state of a terminal device according to another embodiment of the disclosure.

FIG. 16 is a schematic flowchart of a method for determining a state of a terminal device according to another embodiment of the disclosure.

DETAILED DESCRIPTION

The technical solutions in the embodiments of the disclosure will be described below in combination with the drawings.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system, a future 5G system or New Radio (NR).

In the embodiments of the disclosure, a terminal device may refer to user equipment, an access terminal, a user unit, a user station, a mobile station, a mobile radio station, a remote station, a remote terminal, a mobile device, a user terminal, a terminal, a wireless communication device, a user agent or a user device. The terminal device may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle device, a wearable device, a terminal device in a future 5G network, a terminal device in a future evolved Public Land Mobile Network (PLMN) or the like. There are no limits made thereto in the embodiments of the disclosure.

In the embodiments of the disclosure, an access network device may be a device configured to communicate with the terminal device, which for example, may be a Base Transceiver Station (BTS) in the GSM or the CDMA, may also be a NodeB (NB) in the WCDMA system and may also be an Evolutional Node B (eNB or eNodeB) in the LTE system. Or the access network device may be a relay station, an access point, a vehicle device, a wearable device, an access network device in the future 5G network, an access network device in the future evolved PLMN or the like.

In the embodiments of the disclosure, a core network device may be a Mobility Management Entity (MME). The embodiments of the disclosure are not limited thereto.

Figure 1:
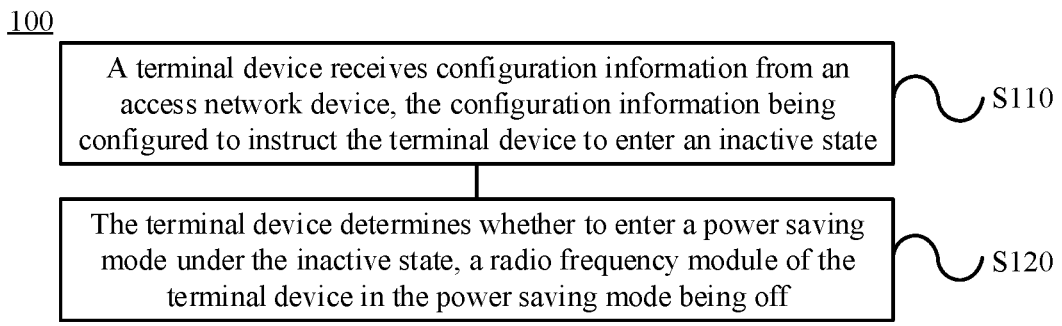
FIG. 1 is a schematic flowchart of a method for determining a state of a terminal device according to an embodiment of the disclosure.

FIG. 1 is a schematic flowchart of a method 100 for determining a state of a terminal device according to an embodiment of the disclosure. The method 100 may be executed by a terminal device. As shown in FIG. 1, the method 100 includes the following operations. In S110, the terminal device receives configuration information from an access network device, the configuration information being configured to instruct the terminal device to enter an inactive state. In S120, the terminal device determines whether to enter a power saving mode under the inactive state, a radio frequency module of the terminal device in the power saving mode being off In the embodiments of the disclosure, the terminal device may enter the inactive state according to configuration information received from the access network device. Under the condition that the terminal device is under the inactive state, the terminal device may further determine whether to enter the power saving mode. The terminal device in the power saving mode may disenable the radio frequency module, so that the terminal device under the inactive state may enter the power saving mode to further reduce power consumption. Specifically, the terminal device in the power saving mode may disenable the radio frequency module and cannot execute any related operation, for example, cell selection, cell reselection, cell measurement, paging and system message reception. However, the embodiments of the disclosure are not limited thereto.

It is to be understood that the terminal device may determine whether to enter the power saving mode under the inactive state in multiple manners. For example, the terminal device may determine according to a configuration of the access network device; or, the terminal device may determine according to a preset rule, for example, by timing through a timer; or, the terminal device may also judge whether the power saving mode may be entered according to a preset condition, for example, a capability of the terminal device in supporting the power saving mode or other service requirements. However, the embodiments of the disclosure are not limited thereto.

Optionally, as an embodiment, the operation that the terminal device determines whether to enter the power saving mode under the inactive state may include that: the terminal device receives configuration information from the access network device, the configuration information being further configured to instruct the terminal device to enter the power saving mode, the terminal device enters the power saving mode while entering the inactive state according to the configuration information. Specifically, the access network device, based on the configuration information, may configure the terminal device to enter the inactive state and may further configure the terminal device to enter the power saving mode such that the terminal device enters the power saving mode while entering the inactive state according to the received configuration information.

Optionally, before the terminal device receives the configuration information, the terminal device may further send capability information to the access network device such that the access network device may determine whether the terminal device enters the power saving mode under the inactive state based on the capability information, the capability information being configured to indicate whether the terminal device supports the power saving mode. In response to the capability information indicating that the terminal device supports the power saving mode, the access network device may instruct the terminal device through the configuration information to enter the power saving mode under the inactive state according to the capability information.

Optionally, before the terminal device receives the configuration information, a core network device may further send the capability information to the access network device, the capability information being configured to indicate whether the terminal device supports the power saving mode, such that the access network device may determine whether the terminal device enters the power saving mode under the inactive state according to the capability information. In response to the capability information indicating that the terminal device supports the power saving mode, the access network device may instruct the terminal device through the configuration information to enter the power saving mode under the inactive state according to the capability information.

Optionally, before the terminal device receives the configuration information, the core network device may further send auxiliary information to the access network device such that the access network device may determine whether the terminal device enters the power saving mode under the inactive state according to the auxiliary information. The auxiliary information may include at least one of the following information: whether the terminal device presently allows the power saving mode to be entered, whether a service being processed by the terminal device allows the power saving mode to be entered, a QoS requirement of a service in the power saving mode, a type of the terminal device and a service mode and motion information of the terminal device.

Specifically, the auxiliary information may include whether the terminal device presently allows the power saving mode to be entered. For example, the core network device may determine whether the terminal device presently allows the power saving mode to be entered and notify the access network device of a determination result through the auxiliary information. When the auxiliary information indicates that the terminal device presently allows, the access network device may determine the terminal device to enter the power saving mode under the inactive state and configure the terminal device through the configuration information. When the auxiliary information indicates that the terminal device presently does not allow, the access network device may determine the terminal device not to enter the power saving mode under the inactive state and may configure the terminal device to enter the inactive state only through the configuration information.

The core network device may determine whether the terminal device presently allows the power saving mode to be entered according to the QoS requirement, for example, a delay requirement, of a service presently processed by the terminal device. However, the embodiments of the disclosure are not limited thereto.

Optionally, the auxiliary information may further include whether a service being processed by the terminal device allows the power saving mode to be entered. For example, the core network device may determine whether the service presently processed by the terminal device allows the power saving mode to be entered and notify a determination result to the access network device through the auxiliary information. When the auxiliary information indicates that the service presently processed by the terminal device allows, the access network device may determine the terminal device to enter the power saving mode under the inactive state and configure the terminal device through the configuration information. When the auxiliary information indicates that the service presently processed by the terminal device does not allow, the access network device may determine the terminal device not to enter the power saving mode under the inactive state and may configure the terminal device only to enter the inactive state through the configuration information.

The core network device may determine whether the service presently processed by the terminal device allows the terminal device to enter the power saving mode according to the QoS requirement, for example, a delay requirement, of the service presently processed by the terminal device. However, the embodiments of the disclosure are not limited thereto.

Optionally, the auxiliary information may further include a QoS requirement of a service in the power saving mode in the terminal device. For example, the core network device may determine the QoS requirement, for example, a delay requirement, of the service that the terminal device may enter the power saving mode, determine whether it allows the terminal device to enter the power saving mode and notify a determination result to the access network device through the auxiliary information. When the auxiliary information indicates that the QoS requirement of the service of the terminal device allows the terminal device to enter the power saving mode, the access network device may determine the terminal device to enter the power saving mode under the inactive state and configure the terminal device through the configuration information. When the auxiliary information indicates that the QoS requirement of the service of the terminal device does not allow the terminal device to enter the power saving mode, the access network device may determine the terminal device not to enter the power saving mode under the inactive state and may configure the terminal device only to enter the inactive state through the configuration information.

Optionally, the auxiliary information may further include the type of the terminal device. Specifically, the core network device may determine the type of the terminal device, for example, whether the terminal device being a terminal device aiming at power saving may be determined, or, the type of the terminal device may be determined to be an Internet of Things (IoT) terminal device. The IoT terminal device may enter the power saving mode. The core network device may notify the type of the terminal device to the access network device through the auxiliary information. When the access network device, according to the type of the terminal device, determines that the terminal device is the terminal device aiming at power saving or determines that the terminal device is the IoT terminal device, the terminal device may be configured through the configuration information to enter the power saving mode under the inactive state. When the access network device determines according to the type of the terminal device that the terminal device cannot enter the power saving mode, the terminal device may be configured through the configuration information to enter the inactive state only.

Optionally, the auxiliary information may further include a mode of a service of the terminal device. The mode of the service may include at least one of the following parameters: a time interval of arrival of the service at the terminal device, a frequency of arrival of the service at the terminal device, a duration of the service at the terminal device, a data volume of a data packet in the service and the amount of the data packet. For example, the frequency of arrival of the service at the terminal device in the service mode of the terminal device may be represented by several levels and, for example, may be divided into a high frequency, a medium frequency and a low frequency according to different time intervals. Specifically, the core network device may determine a mode of a service of the terminal device, for example, determining the time interval of arrival of the service at the terminal device and the data volume and the amount of the data packet(s), and send the auxiliary information including the mode of the service to the access network device. When the access network device determines according to the service mode in the auxiliary information that the terminal device presently processes more services relatively frequently, it may be determined that the terminal device cannot enter the power saving mode and the terminal device may be configured through the configuration information to enter the inactive state only. When the access network device determines according to the service mode that the terminal device presently has no service to be processed or processes few services, it may be determined that the terminal device may enter the power saving mode and the terminal device may configured through the configuration information to enter the inactive state and also enter the power saving mode.

Optionally, the auxiliary information may further include the motion information of the terminal device, the motion information being configured to indicate a motion state and/or a movement rate of the terminal device. For example, the motion state of the terminal device may be classified to be moving and standstill. Moving may further be classified into different states, including high-speed moving and low-speed moving, etc. according to speed. Specifically, the core network device may determine the motion information of the terminal device, for example, the motion state of the terminal device, and send the auxiliary information including the motion state to the access network device. When the access network device determines according to the motion state in the auxiliary information that the terminal device is presently in the moving state, it may be determined that the terminal device cannot enter the power saving mode and the terminal device may be configured through the configuration information to enter the inactive state only. When the access network device determines according to the motion state that the terminal device is presently in the still state or moves at a low speed, it may be determined that the terminal device may enter the power saving mode and the terminal device may be configured through the configuration information to enter the inactive state and also enter the power saving mode.

Optionally, as an embodiment, the operation that the terminal device determines whether to enter the power saving mode under the inactive state may further include that: in response to the terminal device entering the inactive state, the terminal device may start a first timer; and in response to timeout of the first timer, the terminal device may enter the power saving mode. Specifically, the terminal device may determine to enter the inactive state according to the received configuration information and start the first timer when entering the inactive state, and in response to timeout of the first timer, the terminal device may enter the power saving mode. A time length of the first timer may be configured for the terminal device by the access network device, or may also be preset, for example, based on a protocol. The embodiments of the disclosure are not limited thereto.

Optionally, the time length of the first timer may be configured for the terminal device by the access network device. For example, the configuration information sent to the terminal device by the access network device and configured to instruct the terminal device to enter the inactive state may include the time length of the first timer. Specifically, the access network device may determine whether to allow the terminal device to enter the power saving mode under the inactive state. For example, the access network device may determine whether the terminal device enters the power saving mode under the inactive state according to the capability information sent by the terminal device or the core network device or according to the auxiliary information sent by the core network device. The capability information may be configured to indicate whether the terminal device supports the power saving mode and the auxiliary information may include at least one of: whether the terminal device presently allows the power saving mode to be entered, whether the service being processed by the terminal device allows the power saving mode to be entered, a QoS requirement of a service in the power saving mode, the type of the terminal device and a service mode and motion information of the terminal device.

It is to be understood that the access network device may configure a time length of the first timer for the terminal device and may further send the time length of the first timer to the core network device, for example, the core network device may receive the time length of the first timer through a control plane entity, such that the core network device may determine time of sending service data to the terminal device according to the time length of the first timer. Specifically, the core network device may determine time when the terminal device is in the power saving mode according to the time length of the first timer, for example, determining a starting moment when the terminal device enters the power saving mode, such that a user plane entity of the core network device may send the service data to the terminal device before the time, that is, the service data may be sent when the terminal device is still in a communication mode and has yet not entered the power saving mode. After the terminal device enters the power saving mode, the core network device may not send the service data and, for example, may cache the service data.

Or, the access network device may determine a first starting moment when the terminal device enters the power saving mode according to the time length of the first timer such that the core network device may send the service data to the terminal device through the access network device. The access network device may send the service data to the terminal device before the first starting moment, that is, the service data may be sent when the terminal device is still in the communication mode and has yet not entered the power saving mode. After the terminal device enters the power saving mode, the access network device may cache the service data and temporally does not send the service data.

Optionally, as an embodiment, the operation that the terminal device determines whether to enter the power saving mode under the inactive state may further include that: after the terminal device receives the configuration information from the access network device, the terminal device may determine to enter the power saving mode according to a preset condition; the terminal device may enter the inactive state and enter the power saving mode; and the terminal device may send acknowledgement information to the access network device, the acknowledgement information being configured for the access network device to determine that the terminal device is under the inactive state and the power saving mode.

It is to be understood that the terminal device may determine to enter the inactive state according to the configuration information and may further determine according to the preset condition that the terminal device enters the power saving mode under the inactive state when the terminal device meets the preset condition. The preset condition may include at least one of the following conditions: determination of the terminal device to support the power saving mode, the terminal device being a terminal device aiming at power saving, a service in the terminal device allowing the terminal device to enter the power saving mode, a service mode of the terminal device and motion information of the terminal device.

Optionally, the preset condition may include that the terminal device determines to support the power saving mode. When the terminal device determines that the preset condition is met, namely the terminal device supports the power saving mode, it may be determined that the power saving mode may be entered, otherwise the power saving mode cannot be entered.

Optionally, the preset condition may further include that the terminal device is a terminal device aiming at power saving. When the terminal device determines that the preset condition is met, namely the terminal device determines that it is the terminal device aiming at power saving, it may be determined that the power saving mode may be entered, otherwise the power saving mode cannot be entered.

Optionally, the preset condition may also include that a service in the terminal device allows the terminal device to enter the power saving mode. When the terminal device determines that the preset condition is met, namely the terminal device determines that the service thereof allows it to enter the power saving mode, for example, the QoS requirement of the service is met, the QoS requirement being a delay requirement, the terminal device may determine that the power saving mode may be entered, otherwise the power saving mode cannot be entered.

Optionally, the preset condition may further include that the terminal device determines whether to enter the power saving mode according to its own service mode. The service mode may include at least one of the following parameters: a time interval of arrival of a service at the terminal device, a frequency of arrival of the service at the terminal device, the duration of the service at the terminal device, a data volume of a data packet in the service and the amount of the data packet. For example, the frequency of arrival of the service at the terminal device in the service mode of the terminal device may be represented through several levels and, for example, may be divided into a high frequency, a medium frequency and a low frequency according to different time intervals. The preset condition may be that: when the frequency of arrival of the service at the terminal device is the high frequency, it may be determined that the terminal device cannot enter the power saving mode; and when the frequency of arrival of the service at the terminal device is the medium frequency or the low frequency, it may be determined that the terminal device may enter the power saving mode. For another example, the service mode of the terminal device may include the time interval of arrival of the service at the terminal device and the data volume and the amount of the data packet, the preset condition may be that: when the terminal device presently processes more services relatively frequently, it may determined that: the terminal device cannot enter the power saving mode; and when the terminal device presently has no service to be processed or processes few services, it may be determined that the terminal device may enter the power saving mode.

Optionally, the preset condition may further include that the terminal device determines whether to enter the power saving mode according to its own motion information. The motion information may be configured to indicate a motion state and/or a movement rate of the terminal device. For example, the motion state of the terminal device may be divided to be moving and standstill. Moving may further be divided into different states, including high-speed moving and low-speed moving, etc. according to speed. The preset condition may be that: when the terminal device is presently in the moving state, it may be determined that the terminal device cannot enter the power saving mode; and when the terminal device is presently in the still state or moves at a low speed, it is determined that the terminal device may enter the power saving mode.

It is to be understood that, when the terminal device determines according to the preset condition that the terminal device can enter the power saving mode under the inactive state, the terminal device may enter the inactive state and the power saving mode and may send the acknowledgement information to the access network device, the acknowledgement information being configured for the access network device to determine that the terminal device is under the inactive state and the power saving mode.

Optionally, as an embodiment, the operation that the terminal device determines whether to enter the power saving mode under the inactive state may include that: after the terminal device receives the configuration information from the access network device, the terminal device may enter the inactive state and determine according to the preset condition that the terminal device may enter the power saving mode under the inactive state; the terminal device may send request information to the access network device, the request information being configured for the terminal device to request for entering the power saving mode under the inactive state; the terminal device may receive response information from the access network device according to the request information, the response information being configured to instruct the terminal device whether to enter the power saving mode under the inactive state; and the terminal device may determine whether to enter the power saving mode under the inactive state according to the response information.

It is to be understood that the terminal device may determine to enter the inactive state according to the configuration information and may determine according to the preset condition that the terminal device may also enter the power saving condition under the inactive state when the terminal device meets the preset condition and further request for entering the power saving mode. The preset condition may include at least one of the following conditions: determination of the terminal device to support the power saving mode, the terminal device being a terminal device aiming at power saving, a service in the terminal device allowing the terminal device to enter the power saving mode, a service mode of the terminal device and motion information of the terminal device. Elaborations are omitted herein.

Correspondingly, the access network device may determine whether the terminal device may also enter the power saving mode under the inactive state according to the request information from the terminal device and send the response information to the terminal device, the response information being configured to indicate whether the terminal device may also enter the power saving mode under the inactive state, such that the terminal device may enter or does not enter the power saving mode according to the response information.

Optionally, the access network device may determine whether the terminal device may enter the power saving mode according to the auxiliary information. Specifically, the core network device may send the auxiliary information to the access network device such that the access network device may determine whether the terminal device enters the power saving mode under the inactive state according to the auxiliary information. The auxiliary information may include at least one of: whether the terminal device presently allows the power saving mode to be entered, whether a service being processed by the terminal device allows the power saving mode to be entered, a QoS requirement of the service in the power saving mode, the type of the terminal device, a service mode and motion information of the terminal device. Elaborations are omitted herein.

It is to be understood that, when the access network device determines that the terminal device cannot enter the power saving mode under the inactive state, the terminal device may be instructed through the response information not to enter the power saving mode. Optionally, the response information may further include a rejection reason of the access network device. However, the embodiments of the disclosure are not limited thereto.

It is to be understood that, when the access network device determines that the terminal device may enter the power saving mode under the inactive state, the terminal device may be instructed through the response information to enter the power saving mode and the terminal device may correspondingly enter the power saving mode according to the response information. Optionally, the terminal device, when receiving the response information, may enter the power saving mode according to the instruction of the response information, or, the terminal device, when receiving the response information, may start a first timer and, when the second timer expires, may enter the power saving mode.

Optionally, a time length of the second timer may be configured for the terminal device by the access network device. For example, the response information may include the time length of the second timer. Or, the time length of the second timer may also be preset, for example, based on a protocol. The embodiments of the disclosure are not limited thereto.

It is to be understood that the access network device may configure the time length of the second timer for the terminal device and may further send the time length of the second timer to the core network device, for example, the core network device may receive the time length of the second timer through the control plane entity, such that the core network device may determine the time of sending the service data to the terminal device according to the time length of the second timer. Specifically, the core network device may determine the time when the terminal device is in the power saving mode according to the time length of the second timer, for example, determining a starting moment when the terminal device enters the power saving mode, such that the user plane entity of the core network device may send the service data to the terminal device before the time, that is, the service data may be sent when the terminal device is still in the communication mode and has yet not entered the power saving mode. After the terminal device enters the power saving mode, the core network device does not send the service data and, for example, may cache the service data.

Or, the access network device may determine a second starting moment when the terminal device enters the power saving mode according to the time length of the second timer such that the core network device may send the service data to the terminal device through the access network device. The access network device may send the service data to the terminal device before the second starting moment, that is, the service data may be sent when the terminal device is still in the communication mode and has yet not entered the power saving mode. After the terminal device enters the power saving mode, the access network device may cache the service data and temporally does not send the service data.

Optionally, as an embodiment, when the terminal device also enters the power saving mode under the inactive state, the method 100 may further include that: in response to the terminal device entering the inactive state, the terminal device may start a third timer; and in response to timeout of the third timer, the terminal device may wake up from the power saving mode and enter a communication mode. Specifically, a radio frequency channel may be off when the terminal device is in the power saving mode, and when the terminal device wakes up from the power saving mode and enters the communication mode, the radio frequency channel may be enabled such that the terminal device may execute operations such as cell selection, cell reselection, cell measurement and paging and the terminal device may recover operations that cannot be executed in the power saving mode. However, the embodiments of the disclosure are not limited thereto.

It is to be understood that the terminal device, after waking up from the power saving mode, may be kept under the inactive state or may be switched from the inactive state to an active state. The embodiments of the disclosure are not limited thereto.

Optionally, a time length of the third timer may be determined by negotiation between the terminal device and the access network device, or, may also be determined by negotiation between the terminal device and the core network device and notified to the access network device by the core network device.

For example, negotiation about the third timer may be implemented in a process of configuring the terminal device to enter the inactive state, for example, the time length of the third timer may be contained in the configuration information, or in a connection establishment or reconfiguration process of the terminal device, or in an attachment process of the terminal device, or in a Protocol Data Unit (PDU) session creation or modification process, or in a bearer creation or reconfiguration process, or in a QoS flow creation or reconfiguration process. The embodiments of the disclosure are not limited thereto.

Optionally, the time length of the third timer may be determined by negotiation between the terminal device and the access network device, and the access network device may determine a third starting moment when the terminal device wakes up from the power saving mode and enters the communication mode according to the time length of the third timer and may send the service data to the terminal device after the third starting moment, namely after the terminal device enters the communication mode. The service data may be sent to the access network device by the core network device through the user plane entity. When the terminal device is in the power saving mode, the service may be temporally cached in the access network device. Or, the access network device may determine the time length of the third timer by negotiation with the terminal device, and the access network device may send the time length of the third timer to the core network device such that the core network device may determine the time of sending the service data to the terminal device according to the time length of the third timer. Specifically, the core network device may determine time when the terminal device is in the communication mode according to the time length of the third timer, for example, determining the moment when the terminal device wakes up from the power saving mode and enters the communication mode, and may send the service data to the terminal device through the user plane entity after the time, namely after the terminal device enters the communication mode. When the terminal device is in the power saving mode, the service data may be temporally cached in the core network device.

Optionally, the time length of the third timer may be determined by negotiation between the terminal device and the core network device, moreover, the core network device may further notify the time length of the third timer to the access network device, and the core network device may determine the time of sending the service time to the terminal device according to the time length of the third timer. Specifically, the core network device may determine the time when the terminal device is in the communication mode, for example, determining the moment when the terminal device wakes up from the power saving mode and enters the communication mode, according to the time length of the third timer and send the service data to the terminal device through the user plane entity after the time, namely after the terminal device enters the communication mode. When the terminal device is in the power saving mode, the service data may be temporally cached in the core network device. Or, the core network device may negotiate with the terminal device to determine the time length of the third timer and the send the time length of the third timer to the access network device through the control plane entity such that the access network device may determine the third starting moment when the terminal device wakes up from the power saving mode and enters the communication mode according to the time length of the third timer and may send the service data to the terminal device after the third starting moment, namely after the terminal device enters the communication mode. The service data may be sent to the access network device by the core network device through the user plane entity, and when the terminal device is in the power saving mode, the service may be temporally cached in the access network device.

Optionally, as an embodiment, when the terminal device also enters the power saving mode under the inactive state, the method 100 may further include that: the terminal device determines to enter the communication mode from the power saving mode according to a paging-area update cycle, a radio frequency channel of the terminal device in the communication mode being on. Specifically, after the terminal device enters the power saving mode, the terminal device may synchronize time when the terminal device enters the communication mode according to the paging-area update cycle, and when the terminal device updates a paging area, for example, at a present moment when the terminal device starts updating the paging area or at a previous moment, the terminal device may wake up from the power saving mode and enter the communication mode, that is, the time when the terminal device enters the communication mode may be synchronized with the paging-area update cycle, such that the terminal device is not needed to additionally set time of entering the communication mode from the power saving mode and the terminal device may be in the communication mode rather than the power saving mode when updating the paging area.

It is to be understood that, in the embodiments of the disclosure, the core network device may include s control plane entity and the control plane entity may be any entity capable of processing various control information, for example, determining the auxiliary information or sending the auxiliary information to the access network device. The core network device may further include a user plane entity and the user plane entity may be any entity capable of processing user data, for example, the user plane entity may send service data to the terminal device or send service data to the terminal device through the access network device. The embodiments of the disclosure are not limited thereto.

It is to be understood that, in the embodiments of the disclosure, the timer, for example, the first timer, the second timer and the third timer, may be any device configurable for timing. For example, the timer may also be called a timing counter. There are no limits made in the disclosure.

Accordingly, in the method for determining a state of a terminal device of the embodiments of the disclosure, the terminal device may receive configuration information from the access network device, enter the inactive state according to the configuration information and may further determine whether the terminal device may enter the power saving mode under the inactive state, for example, the terminal device may determine through a configuration of the access network device, or determine based on the timers or request for entering the power saving mode based on the preset condition, so that the terminal device under the inactive state may enter the power saving mode, and power consumption of the terminal device may further be reduced.

The method for determining a state of a terminal device according to the embodiments of the disclosure is described above in combination with FIG. 1 in detail from the angle of the terminal device. A method for determining a state of a terminal device according to the embodiments of the disclosure will be described below in combination with FIG. 2 to FIG. 3 from the angle of the access network device.

FIG. 2 is a schematic flowchart of a method 200 for determining a state of a terminal device according to another embodiment of the disclosure. The method 200 may be executed by an access network device. As shown in FIG. 2, the method 200 includes the following operations. In S210, the access network device determines whether a terminal device enters a power saving mode under an inactive state, a radio frequency module of the terminal device in the power saving mode being off. In S220, the access network device sends configuration information to the terminal device, the configuration information being configured to instruct the terminal device to enter the inactive state and instruct whether to enter the power saving mode under the inactive state.

Optionally, before the operation that the access network device determines whether the terminal device enters the power saving mode under the inactive state, the method may further include that: the access network device receives capability information from the terminal device or a core network device, the capability information being configured to indicate whether the terminal device supports the power saving mode; and the operation that the access network device determines whether the terminal device enters the power saving mode under the inactive state may include that: in response to the capability information indicating that the terminal device supports the power saving mode, the access network device may determine the terminal device to enter the power saving mode under the inactive state, or, in response to the capability information indicating that the terminal device does not support the power saving mode, the access network device may determine the terminal device not to enter the power saving mode under the inactive state.

Optionally, before the operation that the access network device determines whether the terminal device enters the power saving mode under the inactive state, the method may further include that: the access network device receives auxiliary information from the core network device. The auxiliary information may include at least one of: whether the terminal device presently allows the power saving mode to be entered, whether a service being processed by the terminal device allows the power saving mode to be entered, a QoS requirement of a service in the power saving mode, a type of the terminal device and a service mode and motion information of the terminal device; the service mode may include at least one of the following parameters: a time interval of arrival of the service at the terminal device, a frequency of arrival of the service at the terminal device, a duration of the service at the terminal device, a data volume of a data packet in the service and the amount of the data packet; and the motion information may be configured to indicate a motion state and/or a movement rate of the terminal device. The operation that the access network device determines whether the terminal device enters the power saving mode under the inactive state may include that: the access network device determines whether the terminal device enters the power saving mode under the inactive state according to the auxiliary information.

Optionally, the configuration information may include a time length of a first timer, the first timer may be configured to be started in response to the terminal device entering the inactive state, and in response to timeout of the first timer, the terminal device may enter the power saving mode.

Optionally, the method 200 may further include that: the access network device sends the time length of the first timer to the core network device, the time length of the first timer being configured for the core network device to determine time of sending service data to the terminal device.

Optionally, the method 200 may further include that: the access network device receives the service data from the core network device; the access network device may determine a first starting moment when the terminal device enters the power saving mode according to the first timer; and the access network device may send the service data to the terminal device before the first starting moment.

Optionally, the method may further include that: the access network device negotiates with the terminal device to determine a time length of a third timer, the third timer being configured to be started in response to the terminal device entering the power saving mode, the terminal device entering a communication mode from the power saving mode in response to timeout of the third timer and a radio frequency channel of the terminal device in the communication mode being on.

Optionally, the configuration information may include the time length of the third timer.

Optionally, the method 200 may further include that: the access network device sends the time length of the third timer to the core network device, the time length of the third timer being configured for the core network device to determine the time of sending the service data to the terminal device.

Optionally, the method 200 may further include that: the access network device receives the service data from the core network device; the access network device determines a third starting moment when the terminal device enters the communication mode according to the third timer; and the access network device sends the service data to the terminal device after the third starting moment.

It is to be understood that the terminal device in the method 200 may correspond to the terminal device in the method 100, the access network device in the method 200 may correspond to the access network device in the method 100 and the core network device in the method 200 may correspond to the core network device in the method 100. Elaborations are omitted herein.

Accordingly, in the method for determining a state of a terminal device of the embodiments of the disclosure, the access network device may determine whether the terminal device may enter the power saving mode under the inactive state and indicate whether the terminal device may enter the power saving mode under the inactive state through the configuration information, so that the terminal device under the inactive state may enter the power saving mode, and power consumption of the terminal device may further be reduced.

Figure 3:
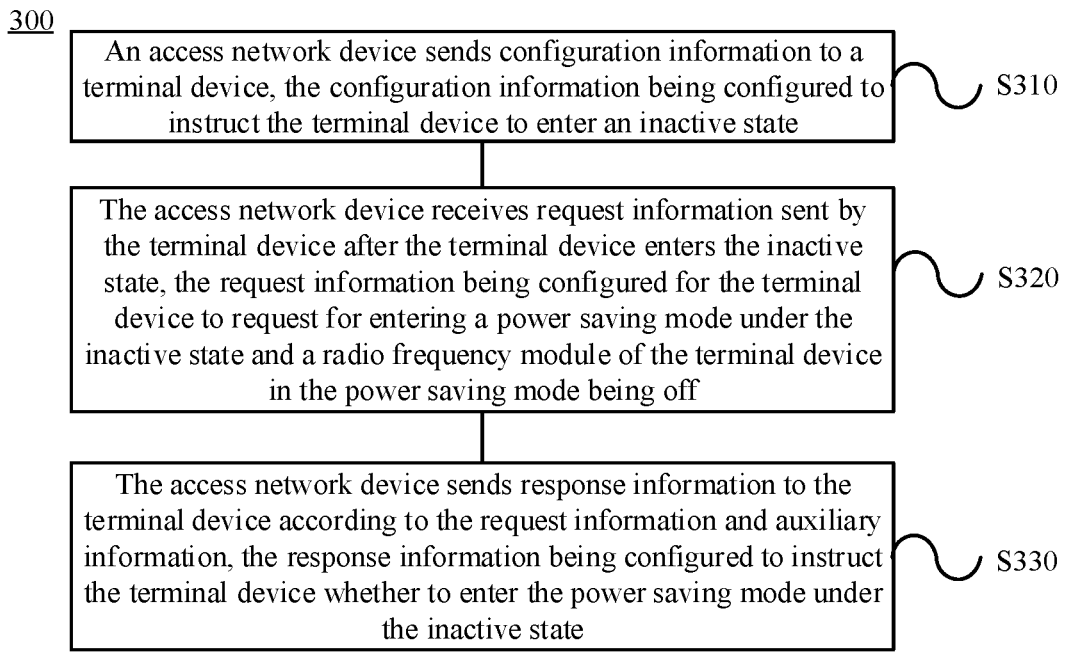
FIG. 3 is a schematic flowchart of a method for determining a state of a terminal device according to another embodiment of the disclosure.

FIG. 3 is a schematic flowchart of a method 300 for determining a state of a terminal device according to another embodiment of the disclosure. The method 300 may be executed by an access network device. As shown in FIG. 3, the method 300 includes the following operations. In S310, the access network device sends configuration information to a terminal device, the configuration information being configured to instruct the terminal device to enter an inactive state. In S320, the access network device receives request information sent by the terminal device after the terminal device enters the inactive state, the request information being configured for the terminal device to request for entering a power saving mode under the inactive state and a radio frequency module of the terminal device in the power saving mode being off. In S330, the access network device sends response information to the terminal device according to the request information and auxiliary information, the response information being configured to instruct the terminal device whether to enter the power saving mode under the inactive state.

Optionally, the response information may be configured to instruct the terminal device not to enter the power saving mode, and the response information may include a rejection reason of the access network device.

Optionally, the response information may be configured to instruct the terminal device to enter the power saving mode according to a second timer, the second timer may be configured to be started in response to reception of the response information by the terminal device, and in response to timeout of the second timer, the terminal device may enter the power saving mode.

Optionally, the response information may include a time length of the second timer.

Optionally, the method 300 may further include that: the access network device sends the time length of the second timer to a core network device, the time length of the second timer being configured for the core network device to determine time of sending service data to the terminal device.

Optionally, the method 300 may further include that: the access network device receives the service data from the core network device; the access network device determines a second starting moment when the terminal device enters the power saving mode according to the second timer; and the access network device may send the service data to the terminal device before the second starting moment.

Optionally, the method may further include that: the access network device receives the auxiliary information from the core network device.

Optionally, the auxiliary information may include at least one of: whether the terminal device presently allows the power saving mode to be entered, whether a service being processed by the terminal device allows the power saving mode to be entered, a QoS requirement of a service in the power saving mode, a type of the terminal device and a service mode and motion information of the terminal device; the service mode may include at least one of the following parameters: a time interval of arrival of the service at the terminal device, a frequency of arrival of the service at the terminal device, a duration of the service at the terminal device, a data volume of a data packet in the service and the amount of the data packet; and the motion information may be configured to indicate a motion state and/or a movement rate of the terminal device.

Optionally, the method further may include that: the access network device negotiates with the terminal device to determine a time length of a third timer, the third timer being configured to be started in response to the terminal device entering the power saving mode, the terminal device entering a communication mode from the power saving mode in response to timeout of the third timer and a radio frequency channel of the terminal device in the communication mode being on.

Optionally, the configuration information may include the time length of the third timer.

Optionally, the method 300 may further include that: the access network device sends the time length of the third timer to the core network device, the time length of the third timer being configured for the core network device to determine the time of sending the service data to the terminal device.

Optionally, the method 300 may further include that: the access network device receives the service data from the core network device; the access network device may determine a third starting moment when the terminal device enters the communication mode according to the third timer; and the access network device may send the service data to the terminal device after the third starting moment.

It is to be understood that the terminal device in the method 300 may correspond to the terminal device in the method 100, the access network device in the method 300 may correspond to the access network device in the method 100 and the core network device in the method 300 may correspond to the core network device in the method 100. Elaborations are omitted herein.

Accordingly, in the method for determining a state of a terminal device of the embodiments of the disclosure, the access network device may configure the terminal device to enter the inactive state, the terminal device may enter the inactive state, acknowledge whether the power saving mode may be entered and request for entering the power saving mode through the request information, and the access network device may determine whether the terminal device may enter the power saving mode under the inactive state based on the related auxiliary information of the terminal device and instruct the terminal device through the response information, so that the terminal device under the inactive state may enter the power saving mode, and power consumption of the terminal device may further be reduced.

The method for determining a state of a terminal device according to the embodiments of the disclosure is described above in combination with FIG. 2 to FIG. 3 in detail from the angle of the access network device. A method for determining a state of a terminal device according to the embodiments of the disclosure will be described below in combination with FIG. 4 to FIG. 5 from the angle of the core network device.

FIG. 4 is a schematic flowchart of a method 400 for determining a state of a terminal device according to another embodiment of the disclosure. The method 400 may be executed by a core network device. As shown in FIG. 4, the method 400 includes the following operations. In S410, the core network device determines timer information of a terminal device through a control plane entity, the timer information including a time length of a second timer and/or a time length of a third timer, the time length of the second timer being configured for the terminal device to enter a power saving mode from a communication mode in response to timeout of the second timer, the time length of the third timer being configured for the terminal device to enter the communication mode from the power saving mode in response to timeout of the third timer, a radio frequency module of the terminal device in the power saving mode being off and a radio frequency channel of the terminal device in the communication mode being on. In S420, the core network device sends service data to the terminal device through a user plane entity according to the timer information.

It is to be understood the second timer in the method 400 may correspond to the second timer and/or first timer in the method 100 and the third timer in the method 400 may correspond to the third timer in the method 100. Elaborations are omitted herein.

Optionally, the operation that the core network device determines the timer information of the terminal device through the control plane entity may include that: the core network device negotiates with the terminal device to determine the timer information through the control plane entity.

Optionally, the operation that the core network device determines the timer information of the terminal device through the control plane entity may include that: the core network device receives the timer information from an access network device through the control plane entity, the timer information being determined by negotiation between the access network device and the terminal device.

Optionally, the method may further include that: the core network device sends auxiliary information to the access network device, the auxiliary information being configured for the access network device to determine whether the terminal device enters the power saving mode under an inactive state.

Optionally, the auxiliary information may include at least one of: whether the terminal device presently allows the power saving mode to be entered, whether a service being processed by the terminal device allows the power saving mode to be entered, a QoS requirement of a service in the power saving mode, a type of the terminal device and a service mode and motion information of the terminal device; the service mode may include at least one of the following parameters: a time interval of arrival of the service at the terminal device, a frequency of arrival of the service at the terminal device, a duration of the service at the terminal device, a data volume of a data packet in the service and the amount of the data packet; and the motion information may be configured to indicate a motion state and/or a movement rate of the terminal device.

It is to be understood that the terminal device in the method 400 may correspond to the terminal device in the method 100, the access network device in the method 400 may correspond to the access network device in the method 100 and the core network device in the method 400 may correspond to the core network device in the method 100. Elaborations are omitted herein.

Accordingly, in the method for determining a state of a terminal device of the embodiments of the disclosure, since the terminal device under the inactive state may also be in the power saving mode, the core network device may determine the timer information of the terminal device about entering the power saving mode or entering the communication mode, may further determine time when the terminal device is in the power saving mode and, according to the time, may send the service data to the terminal device when the terminal device is in the communication mode and temporally cach the service data when the terminal device is in the power saving mode. Therefore, impact on transmission of the service data is avoided, and meanwhile, power consumption of the terminal device is also reduced.

FIG. 5 is a schematic flowchart of a method 500 for determining a state of a terminal device according to another embodiment of the disclosure. The method 500 may be executed by a core network device. As shown in FIG. 5, the method 500 includes the following operations. In S510, the core network device negotiates with a terminal device to determine timer information through a control plane entity, the timer information including a time length of a second timer and/or a time length of a third timer, the time length of the second timer being configured for the terminal device to enter a power saving mode from a communication mode in response to timeout of the second timer, the time length of the third timer being configured for the terminal device to enter the communication mode from the power saving mode in response to timeout of the third timer, a radio frequency module of the terminal device in the power saving mode being off and a radio frequency channel of the terminal device in the communication mode being on. In S520, the core network device sends the timer information to an access network device through the control plane entity, the timer information being configured for the access network device to determine time when the terminal device is in the communication mode. In S530, the core network device sends service data to the access network device through a user plane entity, the service data being configured to be sent to the terminal device by the access network device within the time.

It is to be understood the second timer in the method 500 may correspond to the second timer and/or first timer in the method 100 and the third timer in the method 500 may correspond to the third timer in the method 100. Elaborations are omitted herein.

Optionally, the method may further include that: the core network device sends auxiliary information to the access network device, the auxiliary information being configured for the access network device to determine whether the terminal device enters the power saving mode under an inactive state.

Optionally, the auxiliary information may include at least one of: whether the terminal device presently allows the power saving mode to be entered, whether a service being processed by the terminal device allows the power saving mode to be entered, a QoS requirement of a service in the power saving mode, a type of the terminal device and a service mode and motion information of the terminal device; the service mode may include at least one of the following parameters: a time interval of arrival of a service at the terminal device, a frequency of arrival of the service at the terminal device, a duration of the service at the terminal device, a data volume of a data packet in the service and the amount of the data packet; and the motion information may be configured to indicate a motion state and/or a movement rate of the terminal device.

It is to be understood that the terminal device in the method 500 may correspond to the terminal device in the method 100, the access network device in the method 500 may correspond to the access network device in the method 100 and the core network device in the method 500 may correspond to the core network device in the method 100. Elaborations are omitted herein.

Accordingly, in the method for determining a state of a terminal device of the embodiments of the disclosure, since the terminal device under the inactive state may also be in the power saving mode, the core network device may determine the timer information of the terminal device about entering the power saving mode or entering the communication mode, and may send the timer information to the access network device to enable the access network device to determine time when the terminal device is in the power saving mode according to the timer information and, according to the time, may send the service data to the terminal device when the terminal device is in the communication mode and may temporally cache the service data when the terminal device is in the power saving mode. Therefore, impact on transmission of the service data is avoided, and meanwhile, power consumption of the terminal device is also reduced.

It is to be understood that the power saving mode that the terminal device enters is described above with the condition that the radio frequency module of the terminal device in the power saving mode is off as an example. Optionally, the terminal device may enter the power saving mode under other conditions. For example, the situation that the terminal device adopts DRX with an extended cycle may also be considered as a power saving mode. The method for determining a state of a terminal device according to another embodiment of the disclosure will be described below in combination with FIG. 14 to FIG. 16.

FIG. 14 is a schematic flowchart of a method 1400 for determining a state of a terminal device according to an embodiment of the disclosure. The method 1400 may be executed by a terminal device. As shown in FIG. 14, the method 1400 includes the following operations. In S1410, the terminal device receives configuration information from an access network device, the configuration information being configured to instruct the terminal device to enter an inactive state. In S1420, the terminal device determines whether to enter a power saving mode under the inactive state, the terminal device in the power saving mode adopting DRX with an extended cycle.

In the embodiments of the disclosure, the power saving mode that the terminal device enters may refer to that the terminal device adopts DRX with an extended cycle, which, compared with disenabling the radio frequency module in response to the terminal device entering the power saving mode in each abovementioned embodiment (for example, methods 100 to 500), may be considered as that the terminal device may select to enter two different power saving modes. However, in regardless of the specific power saving mode selected by the terminal device, the process that the terminal device determines whether to enter the power saving mode under the inactive state may be applied to each abovementioned embodiment. That is, the power saving mode in each abovementioned embodiment may refer to that the terminal device may disenable the radio frequency module or may refer to that the terminal device adopts DRX with an extended cycle. For simplicity, elaborations are omitted herein.

Descriptions will be made below in combination with some specific embodiments with the condition that the terminal device adopts DRX with an extended cycle as an example.

Optionally, as an embodiment, the terminal device may receive configuration information from the access network device in S1410, and the configuration information may be configured to instruct the terminal device to enter the inactive state and may further configured to instruct the terminal device to enter the power saving mode. For example, the configuration information may include an extended cycle of DRX, and in such case, the terminal device may determine to simultaneously enter the power saving mode and adopt DRX with the extended cycle according to the extended cycle of the DRX under the inactive state according to the configuration information.

Optionally, as an embodiment, the terminal device may also determine whether to enter the power saving mode under the inactive state according to other conditions. For example, the terminal device may determine whether a cycle of extended DRX in an idle state has been determined by negotiation with a core network device under the condition of determining to enter the inactive state according to the configuration information. Specifically, when the terminal device has determined the cycle of extended DRX in the idle state by negotiation with the core network device, the terminal device may determine to enter the power saving mode, and meanwhile, the terminal device may also determine a minimum value from the cycle of extended DRX in the idle state and a time length of a Non-Access Stratum (NAS) message retransmission timer to be the extended cycle of the DRX.

For another example, the terminal device may also determine to enter the power saving mode according to a preset condition under the condition that the terminal device determines to enter the inactive state according to the configuration information. Specifically, the preset condition may include at least one of the following conditions: determination of the terminal device to support the power saving mode; the terminal device being a terminal device aiming at power saving; a service in the terminal device allowing the terminal device to enter the power saving mode; a service mode of the terminal device, the service mode including at least one of the following parameters: a time interval of arrival of the service at the terminal device, a frequency of arrival of the service at the terminal device, a duration of the service at the terminal device, a data volume of a data packet in the service and the amount of the data packet; motion information of the terminal device, the motion information being configured to indicate a motion state and/or a movement rate of the terminal device; and determination of the extended cycle of the DRX by negotiation between the terminal device and a core network.

When the terminal device also determines to enter the power saving mode under the inactive state, the terminal device, after entering the inactive state and the power saving mode, may send acknowledgement information to the access network device, the acknowledgement information being configured for the access network device to determine that the terminal device is under the inactive state and the power saving mode.

Optionally, as an embodiment, the operation that the terminal device determines whether to enter the power saving mode under the inactive state may further include that: after the terminal device receives the configuration information from the access network device, the terminal device may enter the inactive state and receive indication information from the access network device or the core network device; and the terminal device may determine to enter the power saving mode according to the indication information. For example, the indication information may be configured to indicate an extended cycle of DRX such that terminal device may adopt DRX with the extended cycle according to the extended cycle of the DRX.

The indication information may include the extended cycle of the DRX. Or, the indication information may include DRX parameter information such that the terminal device may determine the extended cycle of the DRX according to the DRX parameter information. For example, the DRX parameter information may include the cycle of extended DRX in the idle state of the terminal device and/or the time length of the NAS message retransmission timer, and in such case, the terminal device may determine a minimum value of the two as the extended cycle of the DRX. The embodiments of the disclosure is not limited thereto.

Accordingly, in the method for determining a state of a terminal device of the embodiments of the disclosure, the terminal device, when determining to enter the inactive state according to the configuration information, may further determine whether the power saving mode may be entered, and the terminal device in the power saving mode may adopt DRX with an extended cycle, so that power consumption of the terminal device may further be reduced.

The method for determining a state of a terminal device according to the embodiments of the disclosure is described above in combination with FIG. 14 in detail from the angle of the terminal device. The method for determining a state of a terminal device according to the embodiments of the disclosure will be described below in combination with FIG. 15 from the angle of the access network device.

Figure 15:
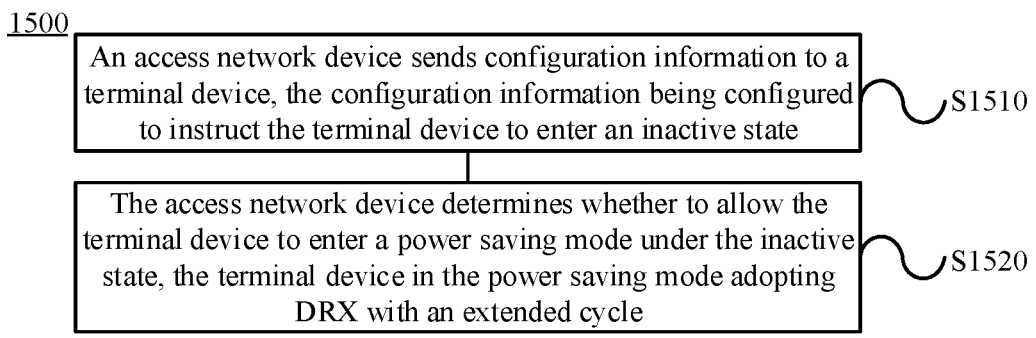
FIG. 15 is a schematic flowchart of a method for determining a state of a terminal device according to another embodiment of the disclosure.

FIG. 15 is a schematic flowchart of a method for determining a state of a terminal device 1500 according to another embodiment of the disclosure. The method 1500 may be executed by an access network device. As shown in FIG. 15, the method 1500 includes the following operations. In S1510, the access network device may send configuration information to a terminal device, the configuration information being configured to instruct the terminal device to enter an inactive state. In S1520, the access network device may determine whether to allow the terminal device to enter a power saving mode under the inactive state, the terminal device in the power saving mode adopting DRX with an extended cycle.

Similar to the method 1400, the power saving mode that the terminal device enters in the method 1500 is still described with the condition that the terminal device adopts DRX with an extended cycle as an example, which may also be applied to each abovementioned embodiment where the power saving mode refers to that the terminal device may disenable the radio frequency channel. For simplicity, elaborations are omitted herein.

Descriptions will be made below in combination with some specific embodiments with the condition that the power saving mode that the terminal device enters refers to that the terminal device adopts DRX with an extended cycle as an example.

Optionally, as an embodiment, before the operation that the access network device determines whether the terminal device enters the power saving mode under the inactive state, the method may further include that: the access network device receives capability information from the terminal device or a core network device, the capability information being configured to indicate whether the terminal device supports the power saving mode; and the operation that the access network device determines whether the terminal device enters the power saving mode under the inactive state may include that: in response to the capability information indicating that the terminal device supports the power saving mode, the access network device determines the terminal device to enter the power saving mode under the inactive state, or, in response to the capability information indicating that the terminal device does not support the power saving mode, the access network device determines the terminal device not to enter the power saving mode under the inactive state.

Optionally, as an embodiment, before the operation that the access network device determines whether the terminal device enters the power saving mode under the inactive state, the method may further include that: the access network device receives auxiliary information from the core network device, the auxiliary information including at least one of: whether the terminal device presently allows the power saving mode to be entered, whether a service being processed by the terminal device allows the power saving mode to be entered, a QoS requirement of a service in the power saving mode, a type of the terminal device, a service mode of the terminal device, motion information and DRX parameter information; the service mode may include at least one of the following parameters: a time interval of arrival of a service at the terminal device, a frequency of arrival of the service at the terminal device, a duration of the service at the terminal device, a data volume of a data packet in the service and the amount of the data packet; the motion information may be configured to indicate a motion state and/or a movement rate of the terminal device; and the DRX parameter information may be configured for the access network device to determine the extended cycle of the DRX; and the operation that the access network device determines whether the terminal device enters the power saving mode under the inactive state may include that: the access network device determines whether the terminal device enters the power saving mode under the inactive state according to the auxiliary information.

It is to be understood that the access network device may determine the extended cycle of the DRX of the terminal device according to the DRX parameter information in the auxiliary information. The extended cycle of the DRX may be a minimum value from a time length of a NAS message retransmission timer and a cycle of extended DRX in an idle state, which is determined by negotiation between the terminal device and the core network device. For example, the extended cycle of the DRX may be determined by a core network, namely the DRX parameter information includes the extended cycle of the DRX. For another example, the extended cycle of the DRX may also be determined by the access network device, and in such case, the DRX parameter information may include the time length of the NAS message retransmission timer and the cycle of extended DRX in the idle state, which is determined by negotiation between the terminal device and the core network device, such that the access network device may determine the minimum value in the two in the DRX parameter information as the extended cycle of the DRX.

Optionally, as an embodiment, if the access network device determines that the terminal device enters the power saving mode under the inactive state, the configuration information may be further configured to instruct the terminal device to enter the power saving mode. That is, through the configuration information, the access network device may instruct the terminal device to enter the inactive state and may also instruct the terminal device to enter the power saving mode. For example, the configuration information may include the extended cycle of the DRX.

Optionally, as an embodiment, when the access network device determines that the terminal device enters the power saving mode under the inactive state, the method 1500 may further include that: the access network device sends indication information to the terminal device, the indication information being configured to instruct the terminal device to enter the power saving mode under the inactive state. That is, the access network device may instruct the terminal device to enter the inactive state and the power saving mode through two pieces of information respectively. For example, the indication information may include the extended cycle of the DRX.

It is to be understood that the terminal device in the method 1500 may correspond to the terminal device in the method 1400, the access network device in the method 1500 may correspond to the access network device in the method 1400 and the core network device in the method 1500 may correspond to the core network device in the method 1400. Elaborations are omitted herein.

Accordingly, in the method for determining a state of a terminal device of the embodiments of the disclosure, the access network device may determine whether the terminal device may enter the power saving mode under the inactive state and indicate whether the terminal device may enter the power saving mode under the inactive state through the configuration information and/or the indication information, so that the terminal device under the inactive state may enter the power saving mode, and power consumption of the terminal device may further be reduced.

The method for determining a state of a terminal device according to the embodiments of the disclosure is described above in combination with FIG. 14 to FIG. 15 in detail from the angle of the terminal device and the access network device. The method for determining a state of a terminal device according to the embodiments of the disclosure will be described below in combination with FIG. 16 from the angle of the core network device.

FIG. 16 is a schematic flowchart of a method for determining a state of a terminal device 1600 according to another embodiment of the disclosure. The method 1600 may be executed by a core network device. As shown in FIG. 16, the method 1600 includes the following operation.

In S1610, the core network device negotiates with a terminal device to determine an extended cycle of DRX adopted for the terminal device, the extended cycle being configured for the terminal device to determine whether to enter a power saving mode under an inactive state and the DRX with the extended cycle being adopted for the terminal device in the power saving mode.

Similar to the methods 1400 and 1500, the power saving mode that the terminal device enters in the method 1600 is still described with the condition that the terminal device adopts DRX with an extended cycle as an example, which may also be applied to each abovementioned embodiment where the power saving mode refers to that the terminal device may disenable a radio frequency channel. For simplicity, elaborations are omitted herein.

The method for determining a state of a terminal device according to the embodiments of the disclosure will be described below in combination with some specific embodiments from the angle of the core network device.

Optionally, as an embodiment, the method 1600 may further include that: the core network device sends DRX parameter information to the terminal device and/or an access network device, the DRX parameter information being configured to indicate the extended cycle of the DRX and the extended cycle of the DRX being a cycle when the terminal device enters the power saving mode and adopts DRX with the extended cycle under the inactive state. The extended cycle of the DRX may be a minimum value of a time length of a NAS message retransmission timer and a cycle of extended DRX in an idle state, which is determined by negotiation between the terminal device and the core network device.

Specifically, the core network device may send the extended cycle of the DRX to the terminal device and/or the access network device, namely the DRX parameter information may include the extended cycle of the DRX. That is, the core network device may determine the minimum value from the time length of the NAS message retransmission timer and the cycle of extended DRX in the idle state, which is determined by negotiation between the terminal device and the core network device, to be the extended cycle of the DRX, and may send the DRX parameter information including the extended cycle of the DRX to the terminal device and/or the access network device.

Or, the core network device may also send the DRX parameter information to the terminal device and/or the access network device, the DRX parameter information including the time length of the NAS message retransmission timer and the cycle of extended DRX in the idle state, which is determined by negotiation between the terminal device and the core network device, such that the terminal device and/or the access device may determine the extended cycle of the DRX when the terminal device adopts extended DRX under the inactive state according to the DRX parameter information, for example, determining the minimum value from the time length of the NAS message retransmission timer and the cycle of extended DRX in the idle state, which is determined by negotiation between the terminal device and the core network device, in the DRX parameter information to be the extended cycle of the DRX.

In the embodiments of the disclosure, before the core network device sends the DRX parameter information to the terminal device and/or the access network device, the core network device may further execute at least one of the following actions: whether the terminal device supports to adopt DRX with the extended cycle under the inactive state; whether the terminal device requests for adopting DRX with the extended cycle under the inactive state; negotiation between the terminal device and the core network device about whether the DRX with the extended cycle is supported under the inactive state; and negotiation between the core network device and the access network device about whether the DRX with the extended cycle is supported or adopted under the inactive state.

Optionally, the core network device may further determine the extended cycle of extended DRX of the terminal device under the inactive state according to at least one of the above determined contents. The embodiments of the disclosure are not limited thereto.

It is to be understood that the terminal device in the method 1600 may correspond to the terminal device in the method 1400, the access network device in the method 1600 may correspond to the access network device in the method 1400 and the core network device in the method 1600 may correspond to the core network device in the method 1400. Elaborations are omitted herein.

Accordingly, in the method for determining a state of a terminal device of the embodiments of the disclosure, since the terminal device under the inactive state may also be in the power saving mode, the core network device may determine an extended cycle of DRX adopted for the terminal device, and then the terminal device may suspend transmission of service data when entering the power saving mode according to the extended cycle under the inactive state. Therefore, impact on transmission of the service data is avoided, and meanwhile, power consumption of the terminal device is reduced.

It is to be understood that, in various embodiments of the disclosure, a sequence number of each process does not mean an execution sequence and the execution sequence of each process should be determined by its function and an internal logic and should not form any limit to an implementation process of the embodiments of the disclosure.

In addition, term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

The method for determining a state of a terminal device according to the embodiments of the disclosure is described above in combination with FIG. 1 to FIG. 5 in detail. A communication device and a communication system according to the embodiments of the disclosure will be described below in combination with FIG. 6 to FIG. 13.

Figure 6:
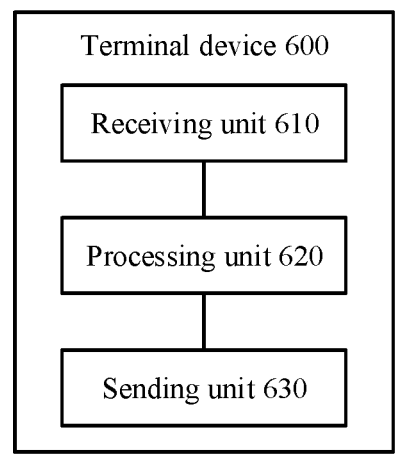
FIG. 6 is a schematic block diagram of a terminal device according to an embodiment of the disclosure.

As shown in FIG. 6, a terminal device 600 according to an embodiment of the disclosure includes a receiving unit 610 and a processing unit 620, and optionally, may further include a sending unit 630. Specifically, the receiving unit 610 is configured to receive configuration information from an access network device, the configuration information being configured to instruct the terminal device to enter an inactive state. The processing unit 620 is configured to determine whether to enter a power saving mode under the inactive state, a radio frequency module of the terminal device in the power saving mode being off.

Optionally, the configuration information is further configured to instruct the terminal device to enter the power saving mode, and the processing unit 620 is specifically configured to enter the power saving mode while entering the inactive state according to the configuration information.

Optionally, the sending unit 630 is configured to send capability information to the access network device, the capability information being configured to indicate whether the terminal device supports the power saving mode and the configuration information being determined by the access network device according to the capability information.

Optionally, the processing unit 620 is specifically configured to, in response to the terminal device entering the inactive state, start a first timer and, in response to timeout of the first timer, enter the power saving mode.

Optionally, the configuration information is further configured to indicate a time length of the first timer.

Optionally, the processing unit 620 is specifically configured to, after the receiving unit 610 receives the configuration information from the access network device, determine to enter the power saving mode according to a preset condition, enter the inactive state and enter the power saving mode. The sending unit 630 is configured to send acknowledgement information to the access network device, the acknowledgement information being configured for the access network device to determine that the terminal device is under the inactive state and the power saving mode.

Optionally, the processing unit 620 is specifically configured to, after the receiving unit 610 receives the configuration information from the access network device, enter the inactive state and determine according to the preset condition that the terminal device is capable of entering the power saving mode under the inactive state. The sending unit 630 is configured to send request information to the access network device, the request information being configured for the terminal device to request for entering the power saving mode under the inactive state. The receiving unit 610 is specifically configured to receive response information from the access network device according to the request information, the response information being configured to instruct the terminal device whether to enter the power saving mode. The processing unit 620 is specifically configured to determine whether to enter the power saving mode according to the response information.

Optionally, the response information may be configured to instruct the terminal device not to enter the power saving mode, and the response information may include a rejection reason of the access network device.

Optionally, the response information may be configured to instruct the terminal device to enter the power saving mode according to a second timer, the processing unit 620 may be specifically configured to, when the receiving unit 610 receives the response information, start the second timer and, in response to timeout of the second timer, enter the power saving mode.

Optionally, the response information may include a time length of the second timer.

Optionally, the preset condition may include at least one of the following conditions: determination of the terminal device to support the power saving mode; the terminal device being a terminal device aiming at power saving; a service in the terminal device allowing the terminal device to enter the power saving mode; a service mode of the terminal device; the service mode may include at least one of the following parameters: a time interval of arrival of the service at the terminal device, a frequency of arrival of the service at the terminal device, a duration of the service at the terminal device, a data volume of a data packet in the service and the amount of the data packet; and motion information of the terminal device; the motion information may be configured to indicate a motion state and/or a movement rate of the terminal device.

Optionally, the processing unit 620 may be specifically configured to, in response to the terminal device entering the power saving mode, start a third timer and, in response to timeout of the third timer, enter a communication mode from the power saving mode, a radio frequency channel of the terminal device in the communication mode being on.

Optionally, the processing unit 620 may be specifically configured to determine a time length of the third timer by negotiation between the terminal device and the access network device or determine a time length of the third timer by negotiation between the terminal device and the core network device.

Optionally, the processing unit 620 may be specifically configured to determine to enter the communication mode from the power saving mode according to a paging-area update cycle, the radio frequency channel of the terminal device in the communication mode being on.

It is to be understood that the terminal device 600 according to the embodiments of the disclosure may correspondingly execute the method 100 in the embodiments of the disclosure. The abovementioned and other operations and/or functions of each unit in the terminal device 600 may be adopted to implement the corresponding flows executed by the terminal device in each method in FIG. 1 to FIG. 5 respectively and will not be elaborated herein for simplicity.

Accordingly, the terminal device of the embodiments the disclosure may receive configuration information from the access network device, enter the inactive state according to the configuration information and may further determine whether the terminal device may enter the power saving mode under the inactive state, for example, determining through a configuration of the access network device, or determining based on the timers or requests for entering the power saving mode based on the preset condition, so that the terminal device under the inactive state may enter the power saving mode, and power consumption of the terminal device may further be reduced.

Figure 7:
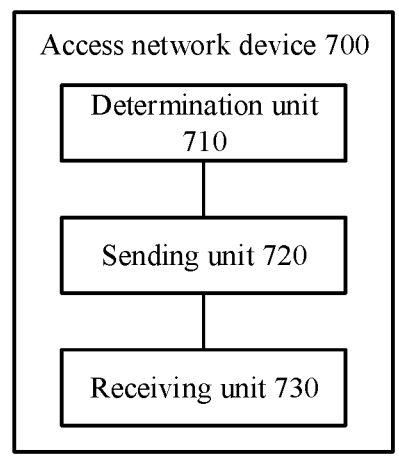
FIG. 7 is a schematic block diagram of an access network device according to an embodiment of the disclosure.

As shown in FIG. 7, an access network device 700 according to an embodiment of the disclosure includes a determination unit 710 and a sending unit 720, and optionally, may further include a receiving unit 730. Specifically, the determination unit 710 is configured to determine whether a terminal device enters a power saving mode under an inactive state, a radio frequency module of the terminal device in the power saving mode being off. The sending unit 720 is configured to send configuration information to the terminal device, the configuration information being configured to instruct the terminal device to enter the inactive state and instruct whether to enter the power saving mode under the inactive state.

Optionally, the receiving unit 730 may be configured to, before the determination unit 710 determines whether the terminal device enters the power saving mode under the inactive state, receive capability information from the terminal device or a core network device, the capability information being configured to indicate whether the terminal device supports the power saving mode. The determination unit 710 may be specifically configured to, in response to the capability information indicating that the terminal device supports the power saving mode, determine the terminal device to enter the power saving mode under the inactive state, or, in response to the capability information indicating that the terminal device does not support the power saving mode, determine the terminal device not to enter the power saving mode under the inactive state.

Optionally, the receiving unit 730 may be configured to, before the determination unit 710 determines whether the terminal device enters the power saving mode under the inactive state, receive auxiliary information from the core network device, the auxiliary information including at least one of: whether the terminal device presently allows the power saving mode to be entered, whether a service being processed by the terminal device allows the power saving mode to be entered, a QoS requirement of a service in the power saving mode, a type of the terminal device and a service mode and motion information of the terminal device; the service mode may include at least one of the following parameters: a time interval of arrival of the service at the terminal device, a frequency of arrival of the service at the terminal device, a duration of the service at the terminal device, a data volume of a data packet in the service and the amount of the data packet; and the motion information may be configured to indicate a motion state and/or a movement rate of the terminal device. The determination unit 710 may be specifically configured to determine whether the terminal device enters the power saving mode under the inactive state according to the auxiliary information.

Optionally, the configuration information may include a time length of a first timer, the first timer is configured to be started in response to the terminal device entering the inactive state, and in response to timeout of the first timer, the terminal device enters the power saving mode.

Optionally, the sending unit 720 may be further configured to send the time length of the first timer to the core network device, the time length of the first timer being configured for the core network device to determine time of sending service data to the terminal device.

Optionally, the receiving unit 730 may be configured to receive the service data from the core network device. The determination unit 710 may be further configured to determine a first starting moment when the terminal device enters the power saving mode according to the first timer. The sending unit 720 may be further configured to send the service data to the terminal device before the first starting moment.

Optionally, the determination unit 710 may be specifically configured to determine a time length of a third timer by negotiation between the access network device and the terminal device, the third timer being configured to be started in response to the terminal device entering the power saving mode, the terminal device entering a communication mode from the power saving mode in response to timeout of the third timer and a radio frequency channel of the terminal device in the communication mode being on.

Optionally, the configuration information may include the time length of the third timer.

Optionally, the sending unit 720 may be further configured to send the time length of the third timer to the core network device, the time length of the third timer being configured for the core network device to determine the time of sending the service data to the terminal device.

Optionally, the receiving unit 730 may be configured to receive the service data from the core network device. The determination unit 710 may be further configured to determine a third starting moment when the terminal device enters the communication mode according to the third timer. The sending unit 720 may be further configured to send the service data to the terminal device after the third starting moment.

It is to be understood that the access network device 700 according to the embodiments of the disclosure may correspondingly execute the method 200 in the embodiments of the disclosure. The abovementioned and other operations and/or functions of each unit in the access network device 700 may be adopted to implement the corresponding flows executed by the access network device in each method in FIG. 1 to FIG. 5 respectively and will not be elaborated herein for simplicity.

Accordingly, the access network device of the embodiments of the disclosure may determine whether the terminal device may enter the power saving mode under the inactive state and may indicate whether the terminal device may enter the power saving mode under the inactive state through the configuration information, so that the terminal device under the inactive state may enter the power saving mode, and power consumption of the terminal device may further be reduced.

Figure 8:
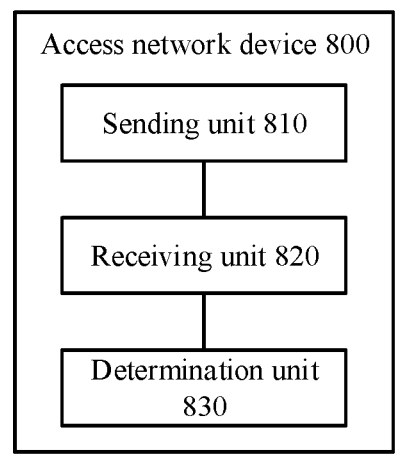
FIG. 8 is another schematic block diagram of an access network device according to an embodiment of the disclosure.

As shown in FIG. 8, an access network device 800 according to an embodiment of the disclosure includes a sending unit 810 and a receiving unit 820, and optionally, may further include a determination unit 830. Specifically, the sending unit 810 is configured to send configuration information to a terminal device, the configuration information being configured to instruct the terminal device to enter an inactive state. The receiving unit 820 is configured to receive request information sent by the terminal device after the terminal device enters the inactive state, the request information being configured for the terminal device to request for entering a power saving mode under the inactive state and a radio frequency module of the terminal device in the power saving mode being off. The sending unit 810 is further configured to send response information to the terminal device according to the request information and auxiliary information, the response information being configured to instruct the terminal device whether to enter the power saving mode under the inactive state.

Optionally, the response information may be configured to instruct the terminal device not to enter the power saving mode, and the response information may include a rejection reason of the access network device.

Optionally, the response information may be configured to instruct the terminal device to enter the power saving mode according to a second timer, the second timer may be configured to be started in response to reception of the response information by the terminal device, and in response to timeout of the second timer, the terminal device may enter the power saving mode.

Optionally, the response information may include a time length of the second timer.

Optionally, the sending unit 810 may be further configured to send the time length of the second timer to a core network device, the time length of the second timer being configured for the core network device to determine time of sending service data to the terminal device.

Optionally, the receiving unit 820 may be further configured to receive the service data from the core network device. The determination unit 830 may be configured to determine a second starting moment when the terminal device enters the power saving mode according to the second timer. The sending unit 810 may be further configured to send the service data to the terminal device before the second starting moment.

Optionally, the receiving unit 820 may be specifically configured to receive the auxiliary information from the core network device.

Optionally, the auxiliary information may include at least one of: whether the terminal device presently allows the power saving mode to be entered, whether a service being processed by the terminal device allows the power saving mode to be entered, a QoS requirement of a service in the power saving mode, a type of the terminal device and a service mode and motion information of the terminal device; the service mode may include at least one of the following parameters: a time interval of arrival of the service at the terminal device, a frequency of arrival of the service at the terminal device, a duration of the service at the terminal device, a data volume of a data packet in the service and the amount of the data packet; and the motion information may be configured to indicate a motion state and/or a movement rate of the terminal device.

Optionally, the determination unit 830 may be configured to determine a time length of a third timer by negotiation between the access network device and the terminal device, the third timer being configured to be started in response to the terminal device entering the power saving mode, the terminal device entering a communication mode from the power saving mode in response to timeout of the third timer and a radio frequency channel of the terminal device in the communication mode being on.

Optionally, the configuration information may include the time length of the third timer.

Optionally, the sending unit 810 may be further configured to send the time length of the third timer to the core network device, the time length of the third timer being configured for the core network device to determine the time of sending the service data to the terminal device.

Optionally, the receiving unit 820 may be further configured to receive the service data from the core network device. The determination unit 830 may be configured to determine a third starting moment when the terminal device enters the communication mode according to the third timer. The sending unit 810 may be further configured to send the service data to the terminal device after the third starting moment.

It is to be understood that the access network device 800 according to the embodiments of the disclosure may correspondingly execute the method 300 in the embodiments of the disclosure. The abovementioned and other operations and/or functions of each unit in the access network device 800 are adopted to implement the corresponding flows executed by the access network device in each method in FIG. 1 to FIG. 5 respectively and will not be elaborated herein for simplicity.

Accordingly, the access network device of the embodiments of the disclosure may configure the terminal device to enter the inactive state, the terminal device may enter the inactive state, acknowledge whether the power saving mode may be entered and request for entering the power saving mode through the request information, and the access network device may determine whether the terminal device may enter the power saving mode under the inactive state based on the related auxiliary information of the terminal device and instruct the terminal device through the response information, so that the terminal device under the inactive state may enter the power saving mode, and power consumption of the terminal device may further be reduced.

Figure 9:
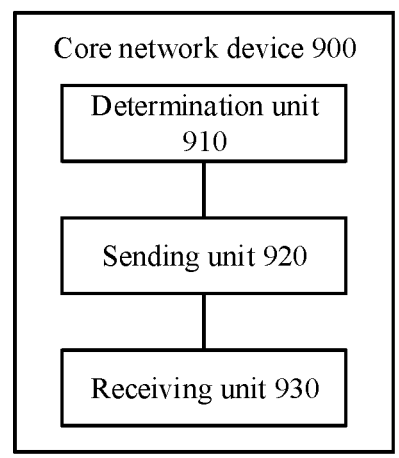
FIG. 9 is a schematic block diagram of a core network device according to an embodiment of the disclosure.

As shown in FIG. 9, a core network device 900 according to an embodiment of the disclosure includes a determination unit 910 and a sending unit 920, and optionally, may further include a receiving unit 930. Specifically, the determination unit 910 is configured to determine timer information of a terminal device through a control plane entity, the timer information including a time length of a second timer and/or a time length of a third timer, the time length of the second timer being configured for the terminal device to enter a power saving mode from a communication mode in response to timeout of the second timer, the time length of the third timer being configured for the terminal device to enter the communication mode from the power saving mode in response to timeout of the third timer, a radio frequency module of the terminal device in the power saving mode being off and a radio frequency channel of the terminal device in the communication mode being on. The sending unit 920 is configured to send service data to the terminal device through a user plane entity according to the timer information.

Optionally, the determination unit 910 may be configured to determine the timer information by negotiation between the core network device and the terminal device through the control plane entity.

Optionally, the receiving unit 930 may be configured to receive the timer information from an access network device through the control plane entity, the timer information being determined by negotiation between the access network device and the terminal device.

Optionally, the sending unit 920 may be further configured to send auxiliary information to the access network device, the auxiliary information being configured for the access network device to determine whether the terminal device enters the power saving mode under an inactive state.

Optionally, the auxiliary information may include at least one of: whether the terminal device presently allows the power saving mode to be entered, whether a service being processed by the terminal device allows the power saving mode to be entered, a QoS requirement of a service in the power saving mode, a type of the terminal device and a service mode and motion information of the terminal device; the service mode may include at least one of the following parameters: a time interval of arrival of the service at the terminal device, a frequency of arrival of the service at the terminal device, a duration of the service at the terminal device, a data volume of a data packet in the service and the amount of the data packet; and the motion information may be configured to indicate a motion state and/or a movement rate of the terminal device.

It is to be understood that the core network device 900 according to the embodiments of the disclosure may correspondingly execute the method 400 in the embodiments of the disclosure. The abovementioned and other operations and/or functions of each unit in the core network device 900 may be adopted to implement the corresponding flows executed by the core network device in each method in FIG. 1 to FIG. 5 respectively and will not be elaborated herein for simplicity.

Accordingly, for the core network device of the embodiments of the disclosure, since the terminal device under the inactive state may also be in the power saving mode, the core network device may determine the timer information of the terminal device about entering the power saving mode or entering the communication mode, may further determine time when the terminal device is in the power saving mode and, according to the time, may send the service data to the terminal device when the terminal device is in the communication mode and may temporally catch the service data when the terminal device is in the power saving mode. Therefore, impact on transmission of the service data is avoided, and meanwhile, power consumption of the terminal device is also reduced.

Figure 10:
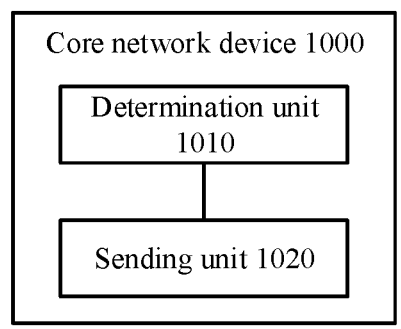
FIG. 10 is another schematic block diagram of a core network device according to an embodiment of the disclosure.

As shown in FIG. 10, a core network device 1000 according to an embodiment of the disclosure includes a determination unit 1010 and a sending unit 1020. Specifically, the determination unit 1010 is configured to determine timer information by negotiation with a terminal device through a control plane entity, the timer information including a time length of a second timer and/or a time length of a third timer, the time length of the second timer being configured for the terminal device to enter a power saving mode from a communication mode in response to timeout of the second timer, the time length of the third timer being configured for the terminal device to enter the communication mode from the power saving mode in response to timeout of the third timer, a radio frequency module of the terminal device in the power saving mode being off and a radio frequency channel of the terminal device in the communication mode being on. The sending unit 1020 is configured to send the timer information to an access network device through the control plane entity, the timer information being configured for the access network device to determine time when the terminal device is in the communication mode. The sending unit 1020 is further configured to send service data to the access network device through a user plane entity, the service data being configured to be sent to the terminal device by the access network device within the time.

Optionally, the sending unit 1020 may be further configured to send auxiliary information to the access network device, the auxiliary information being configured for the access network device to determine whether the terminal device enters the power saving mode under an inactive state.

Optionally, the auxiliary information may include at least one of: whether the terminal device presently allows the power saving mode to be entered, whether a service being processed by the terminal device allows the power saving mode to be entered, a QoS requirement of a service in the power saving mode, a type of the terminal device and a service mode and motion information of the terminal device; the service mode may include at least one of the following parameters: a time interval of arrival of the service at the terminal device, a frequency of arrival of the service at the terminal device, a duration of the service at the terminal device, a data volume of a data packet in the service and the amount of the data packet; and the motion information may be configured to indicate a motion state and/or a movement rate of the terminal device.

It is to be understood that the core network device 1000 according to the embodiments of the disclosure may correspondingly execute the method 500 in the embodiments of the disclosure. The abovementioned and other operations and/or functions of each unit in the core network device 1000 may be adopted to implement the corresponding flows executed by the core network device in each method in FIG. 1 to FIG. 5 respectively and will not be elaborated herein for simplicity.

Accordingly, for the core network device of the embodiments of the disclosure, since the terminal device under the inactive state may also be in the power saving mode, the core network device may determine the timer information of the terminal device about entering the power saving mode or entering the communication mode, may send the timer information to the access network device to enable the access network device to determine time when the terminal device is in the power saving mode according to the timer information and, according to the time, may send the service data to the terminal device when the terminal device is in the communication mode and temporally cache the service data when the terminal device is in the power saving mode. Therefore, impact on transmission of the service data is avoided, and meanwhile, power consumption of the terminal device is also reduced.

The method for determining a state of a terminal device according to the embodiments of the disclosure is described above in combination with FIG. 14 to FIG. 16 in detail and a communication device according to the embodiments of the disclosure will be described below in combination with FIG. 17.

Figure 17:
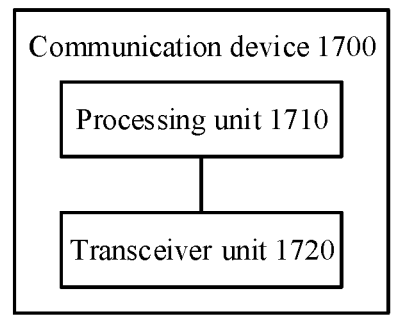
FIG. 17 is a schematic block diagram of a communication device according to an embodiment of the disclosure.

FIG. 17 is a schematic block diagram of a communication device 1700 according to an embodiment of the disclosure. As shown in FIG. 17, the communication device 1700 may include a processing unit 1710 and a transceiver unit 1720.

Optionally, the communication device 1700 may be the terminal device of the embodiments of the disclosure. For example, the communication device 1700 may correspondingly execute the method 1400 in the embodiments of the disclosure. That is, the transceiver unit 1720 is configured to receive configuration information from an access network device, the configuration information being configured to instruct the terminal device to enter an inactive state. The processing unit 1710 is configured to determine whether to enter a power saving mode under the inactive state, DRX with an extended cycle being adopted for the terminal device in the power saving mode. It is to be understood that the abovementioned and other operations and/or functions of each unit in the communication device 1700 may be adopted to implement the corresponding flows executed by the terminal device in each method in FIG. 14 to FIG. 16 respectively and, for simplicity, will not be elaborated herein.

Optionally, the communication device 1700 may also be the access network device of the embodiments of the disclosure. For example, the communication device 1700 may correspondingly execute the method 1500 in the embodiments of the disclosure. That is, the transceiver unit 1720 is configured to send configuration information to a terminal device, the configuration information being configured to instruct the terminal device to enter an inactive state. The processing unit 1710 is configured to determine whether to allow the terminal device to enter a power saving mode under the inactive state, DRX with an extended cycle being adopted for the terminal device in the power saving mode. It is to be understood that the abovementioned and other operations and/or functions of each unit in the communication device 1700 are adopted to implement the corresponding flows executed by the access network device in each method in FIG. 14 to FIG. 16 respectively and, for simplicity, will not be elaborated herein.

Optionally, the communication device 1700 may also be the core network device of the embodiments of the disclosure. For example, the communication device 1700 may correspondingly execute the method 1600 in the embodiments of the disclosure. That is, the transceiver unit 1710 is configured to determine an extended cycle of DRX for a termina device by negotiation between the access network device and the terminal device, the extended cycle being configured for the terminal device to determine whether to enter a power saving mode under an inactive state and the DRX with the extended cycle being adopted for the terminal device in the power saving mode. It is to be understood that the abovementioned and other operations and/or functions of each unit in the communication device 1700 may be adopted to implement the corresponding flows executed by the core network device in each method in FIG. 14 to FIG. 16 respectively and, for simplicity, will not be elaborated herein.

Figure 11:
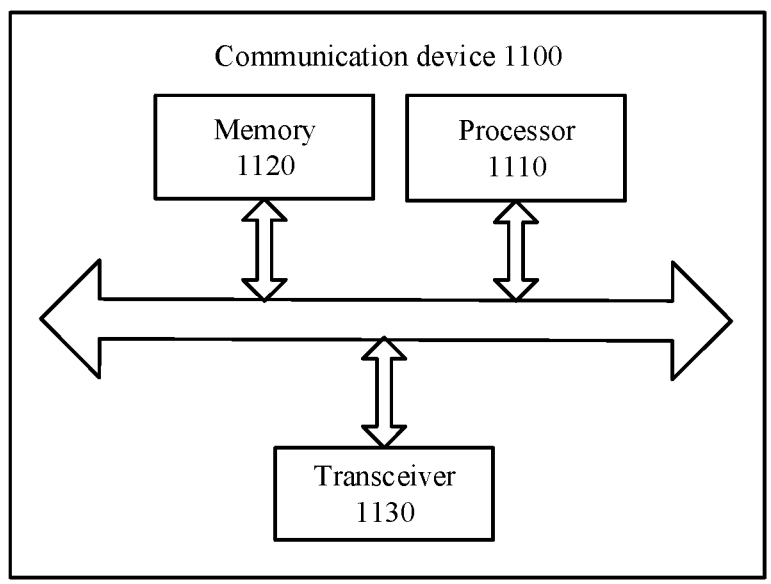
FIG. 11 is a schematic block diagram of a communication device according to an embodiment of the disclosure.

FIG. 11 is a schematic block diagram of a communication device 1100 according to an embodiment of the disclosure. The communication device 1100 shown in FIG. 11 includes a processor 1110, and the processor 1110 may call and run a computer program in a memory to implement the method 100 in the embodiments of the disclosure.

Optionally, as shown in FIG. 11, the communication device 1100 may further include the memory 1120. The processor 1110 may call and run the computer program in the memory 1120 to implement the method in the embodiments of the disclosure.

The memory 1120 may be an independent device independent of the processor 1110 and may also be integrated into the processor 1110.

Optionally, as shown in FIG. 11, the communication device 1100 may further include a transceiver 1130, and the processor 1110 may control the transceiver 1130 to communicate with another device, specifically sending information or data to other devices or receiving information or data from other devices.

The transceiver 1130 may include a transmitter and a receiver. The transceiver 1130 may further include antennae, and the number of the antennae may be one or more.

Optionally, the communication device 1100 may be the terminal device of the embodiments of the disclosure, and the communication device 1100 may implement corresponding flows implemented by the terminal device in each method of the embodiments of the disclosure. For simplicity, elaborations are omitted herein.

Optionally, the communication device 1100 may be the access network device of the embodiments of the disclosure, and the communication device 1100 may implement corresponding flows implemented by the access network device in each method of the embodiments of the disclosure. For simplicity, elaborations are omitted herein.

Optionally, the communication device 1100 may be the core network device of the embodiments of the disclosure, and the communication device 1100 may implement corresponding flows implemented by the core network device in each method of the embodiments of the disclosure. For simplicity, elaborations are omitted herein.

Figure 12:
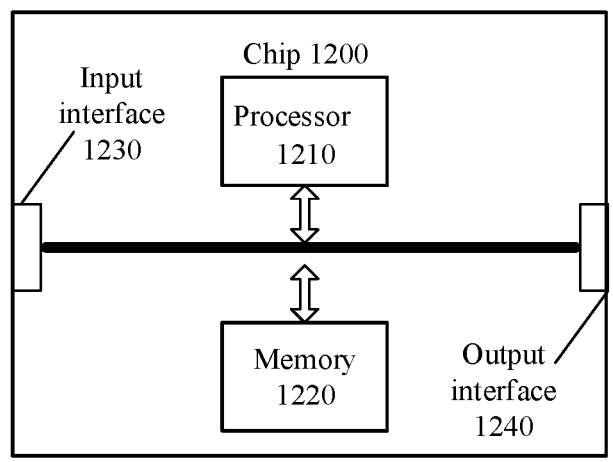
FIG. 12 is a schematic block diagram of a chip according to an embodiment of the disclosure.

FIG. 12 is a schematic block diagram of a chip 1200 according to an embodiment of the disclosure. The chip 1200 shown in FIG. 12 includes a processor 1210, and the processor 1210 may call and run a computer program in a memory to implement the methods in the embodiments of the disclosure.

Optionally, as shown in FIG. 12, the chip 1200 may further include the memory 1220. The processor 1210 may call and run the computer program in the memory 1220 to implement the methods in the embodiments of the disclosure.

The memory 1220 may be an independent device independent of the processor 1210 and may also be integrated into the processor 1210.

Optionally, the chip 1200 may further include an input interface 1230. The processor 1210 may control the input interface 1230 to communicate with another device or chip, specifically acquiring information or data from the other device or chip.

Optionally, the chip 1200 may further include an output interface 1240. The processor 1210 may control the output interface 1240 to communicate with other devices or chips, specifically outputting information or data from other devices or chips.

Optionally, the chip may be applied to the terminal device of the embodiments of the disclosure, and the chip may implement corresponding flows implemented by the terminal device in each method of the embodiments of the disclosure. For simplicity, elaborations are omitted herein.

Optionally, the chip may be applied to the access network device of the embodiments of the disclosure, and the chip may implement corresponding flows implemented by the access network device in each method of the embodiments of the disclosure. For simplicity, elaborations are omitted herein.

Optionally, the chip may be applied to the core network device of the embodiments of the disclosure, and the chip may implement corresponding flows implemented by the core network device in each method of the embodiments of the disclosure. For simplicity, elaborations are omitted herein.

It is to be understood that the chip mentioned in the embodiments of the disclosure may also be called a system-level chip, a system chip, a chip system or a system on chip, etc.

The processor mentioned above may be a universal processor, a Digital Signal Processor (DSP), a Field Programmable Gate Array (FPGA), an Application Specific Integrated Circuit (ASIC) or another programmable logical device, transistor logical device and discrete hardware component, etc. The universal processor mentioned above may be a microprocessor or may also be any conventional processor and the like.

The memory mentioned above may be a volatile memory or a nonvolatile memory, or may also include both of the volatile and nonvolatile memories. The nonvolatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM).

It is to be understood that the memory is exemplarily but unlimitedly described. For example, the memory in the embodiments of the disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM) and a Direct Rambus RAM (DR RAM). That is, the memory in the embodiments of the disclosure is intended to include, but not limited to, memories of these and any other proper types.

Figure 13:
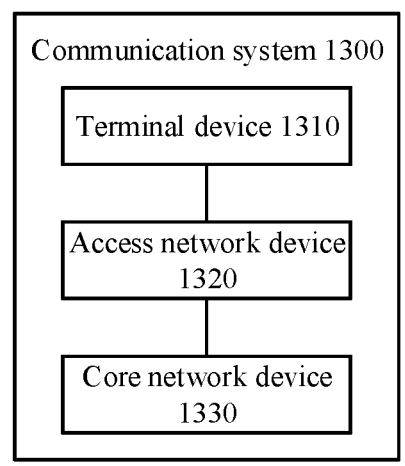
FIG. 13 is a schematic block diagram of a communication system according to an embodiment of the disclosure.

FIG. 13 is a schematic block diagram of a communication system 1300 according to an embodiment of the disclosure. As shown in FIG. 13, the communication system 1300 includes a terminal device 1310, an access network device 1320 and a core network device 1330.

The terminal device 1310 may be configured to implement the corresponding functions achieved by the terminal device in the methods 100 to 500 or the methods 1400 to 1600. A composition of the terminal device 1310 may be shown as the terminal device 600 in FIG. 6 or the communication device 1700 in FIG. 17. For simplicity, elaborations are omitted herein.

The access network device 1320 may be configured to implement the corresponding functions realized by the access network device in the methods 100 to 500 or the methods 1400 to 1600. A composition of the access network device 1320 may be shown as the access network devices 700 and 800 in FIG. 7 and FIG. 8 or the communication device 1700 in FIG. 17. For simplicity, elaborations are omitted herein.

The core network device 1330 may be configured to implement the corresponding functions realized by the core network device in the methods 100 to 500 or the methods 1400 to 1600. A composition of the core network device 1330 may be shown as the core network devices 900 and 1000 in FIG. 9 and FIG. 10 or the communication device 1700 in FIG. 17. For simplicity, elaborations are omitted herein.

The invention claimed is:

1. A method for determining a state of a terminal device, comprising:
    receiving, by a terminal device, configuration information from an access network device, wherein the configuration information is configured to instruct the terminal device to enter an inactive state; and
    determining, by the terminal device, whether to enter a power saving mode under the inactive state, wherein a radio frequency module of the terminal device in the power saving mode is off,
    wherein determining, by the terminal device, whether to enter the power saving mode under the inactive state comprises:
    after the terminal device receives the configuration information from the access network device, entering, by the terminal device, the inactive state and determining, by the terminal device, according to a preset condition that the terminal device is capable of entering the power saving mode under the inactive state;
    sending, by the terminal device, request information to the access network device, the request information being configured for the terminal device to request for entering the power saving mode under the inactive state;
    receiving, by the terminal device, response information from the access network device according to the request information, the response information being configured to instruct the terminal device whether to enter the power saving mode; and determining, by the terminal device, whether to enter the power saving mode according to the response information, wherein when the response information is configured to instruct the terminal device to enter the power saving mode according to a second timer, determining, by the terminal device, whether to enter the power saving mode according to the response information comprises:

in response to reception of the response information, starting, by the terminal device, the second timer; and in response to timeout of the second timer, entering, by the terminal device, the power saving mode, wherein the response information comprises a time length of the second timer.

2. The method of claim 1, wherein the configuration information is further configured to instruct the terminal device to enter the power saving mode, and determining, by the terminal device, whether to enter the power saving mode under the inactive state comprises:

entering, by the terminal device, the power saving mode while entering the inactive state according to the configuration information.

3. The method of claim 1, wherein the preset condition comprises at least one of following conditions:

determination of the terminal device to support the power saving mode;

the terminal device being a terminal device aiming at power saving;

a service in the terminal device allowing the terminal device to enter the power saving mode;

a mode of a service of the terminal device, where the mode of the service comprises at least one of following parameters: a time interval of arrival of the service at the terminal device, a frequency of arrival of the service at the terminal device, a duration of the service at the terminal device, a data volume of a data packet in the service and the amount of the data packet; or motion information of the terminal device, the motion information being configured to indicate at least one of a motion state or a movement rate of the terminal device.

4. A terminal device, comprising:

a processor; and a memory, wherein the memory is configured to store a computer program executable by the processor; and a transceiver, configured to send and receive information under control of the processor, wherein the processor is configured to:

control the transceiver to receive configuration information from an access network device, the configuration information being configured to instruct the terminal device to enter an inactive state; and determine whether to enter a power saving mode under the inactive state, a radio frequency module of the terminal device in the power saving mode being off wherein the processor is specifically configured to:

after the transceiver receives the configuration information from the access network device, make the terminal device to enter the inactive state and determine according to the preset condition that the terminal device is capable of entering the power saving mode under the inactive state;

wherein the transceiver is further configured to:

send request information to the access network device, the request information being configured for the terminal device to request for entering the power saving mode under the inactive state; and receive response information from the access network device according to the request information, the response information being configured to instruct the terminal device whether to enter the power saving mode; and the processor is specifically configured to: determine whether to make the terminal device to enter the power saving mode according to the response information, wherein when the response information is configured to instruct the terminal device to enter the power saving mode according to a second timer, the processor is specifically configured to:

in response to reception of the response information, start the second timer, and in response to timeout of the second timer, enter the power saving mode, wherein the response information comprises a time length of the second timer.

5. The terminal device of claim 4, wherein the response information is configured to instruct the terminal device not to enter the power saving mode, and the response information comprises a rejection reason of the access network device.

6. The terminal device of claim 4, wherein the processor is specifically configured to:

in response to the terminal device entering the power saving mode, start a third timer; and in response to timeout of the third timer, make the terminal device to enter a communication mode from the power saving mode, a radio frequency channel of the terminal device in the communication mode being on.

7. The terminal device of claim 6, wherein the processor is specifically configured to:

determine a time length of the third timer by negotiation between the terminal device and the access network device; or determine a time length of the third timer by negotiation between the terminal device and the core network device.

8. The terminal device of claim 4, wherein the processor is specifically configured to:

determine to make the terminal device to enter a communication mode from the power saving mode according to a paging-area update cycle, wherein a radio frequency channel of the terminal device in the communication mode is on.

* * * * *